US011388235B1

(12) United States Patent
Thiruvasakan et al.

(10) Patent No.: US 11,388,235 B1
(45) Date of Patent: Jul. 12, 2022

(54) DECOUPLING VOLUME DEPLOYMENT REQUIREMENTS AND CODE IMPLEMENTATION

(71) Applicant: NetApp, Inc., Sunnyvale, CA (US)

(72) Inventors: Priya Thiruvasakan, Sunnyvale, CA (US); Wesley R. Witte, Campbell, CA (US); Youyuan Wu, Sunnyvale, CA (US); Abhishek Maurya, Santa Clara, CA (US); Mohammed Haroon Shareef, Sunnyvale, CA (US); Sachin Pandit, Sunnyvale, CA (US); Gyanendra Pradhan, Campbell, CA (US); Sundeep Singh, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/244,521

(22) Filed: Apr. 29, 2021

Related U.S. Application Data

(60) Provisional application No. 63/157,313, filed on Mar. 5, 2021.

(51) Int. Cl.
*H04L 29/08* (2006.01)
*H04L 67/1097* (2022.01)
*H04L 67/60* (2022.01)
*H04L 67/51* (2022.01)

(52) U.S. Cl.
CPC ......... *H04L 67/1097* (2013.01); *H04L 67/16* (2013.01); *H04L 67/32* (2013.01)

(58) Field of Classification Search
CPC ...... H04L 67/1097; H04L 67/32; H04L 67/16
See application file for complete search history.

(56) References Cited

U.S. PATENT DOCUMENTS

| | | | |
|---|---|---|---|
| 7,664,913 B2* | 2/2010 | Cassell | G06F 3/0689 |
| | | | 711/114 |
| 8,495,221 B1* | 7/2013 | Tsunoda | H04L 67/1097 |
| | | | 709/226 |
| 8,793,343 B1* | 7/2014 | Sorenson, III | G06F 16/183 |
| | | | 709/219 |
| 9,372,637 B1* | 6/2016 | Alatorre | G06F 3/067 |
| 2013/0290571 A1* | 10/2013 | Rizzo | G06F 3/067 |
| | | | 710/19 |
| 2016/0127200 A1* | 5/2016 | Dippenaar | G06F 3/0605 |
| | | | 709/224 |
| 2016/0277498 A1* | 9/2016 | Kulkarni | H04L 67/10 |

* cited by examiner

*Primary Examiner* — Michael A Keller
*Assistant Examiner* — Jsing Forng Lin
(74) *Attorney, Agent, or Firm* — Keith Lutsch PC

(57) ABSTRACT

Systems, methods, and machine-readable media are disclosed for collecting, maintaining, and retrieving use and limit data for connected resources, as well as determining an optimal location for creating a new volume (or volumes) on a storage platform and placing the volume at the determined location. A resource tracker collects resource use and/or limits data and stores it in a database. A volume placement service receives a volume deployment specification having constraints for creating a new volume. The volume placement service retrieves the data from the database. The volume placement service identifies an optimal location for the volume based at least in part on given constraints from the specification and the resource usage data. The system places the requested volume at the determined location.

20 Claims, 12 Drawing Sheets

DECOUPLING VOLUME DEPLOYMENT REQUIREMENTS AND CODE IMPLEMENTATION

CROSS REFERENCE TO RELATED APPLICATIONS

This application claims priority to and the benefit of U.S. Provisional Patent Application No. 63/157,313, filed on Mar. 5, 2021, which is incorporated herein by reference in its entirety as if fully set forth below in its entirety and for all applicable purposes.

This application is related to U.S. application Ser. No. 17/244,467, filed Apr. 29, 2021, entitled "Volume Placement Based on Resource Usage" and U.S. application Ser. No. 17/244,492, filed Apr. 29, 2021, entitled "Volume Placement Based on Resource Use and Scoring Functions."

TECHNICAL FIELD

The present description relates to volume placement in a storage system. More specifically, the present description relates to systems and methods for determining and performing volume placement within the storage system.

BACKGROUND

Cloud computing involves the on-demand availability of cloud resources, such as storage and compute resources, to requesting users. Often, cloud compute providers may make these cloud resources available to users with an accompanying storage solution. Sometimes, cloud computing providers might not be the best suited provider of reliable cloud storage solutions. To provide a better service for the user, the cloud computing provider may partner with a storage platform. The cloud computing providers may do so without any extra effort from the user.

Problems arise, however, because of the added complexity of combining the separate cloud computing and storage platforms. More generally, problems arise with how to make the best use of the storage available while working within system constraints and the user's requirements. For example, approaches that rely on a simple round-robin scheme for volume placement within cloud storage do not take into account these added complexities, including network resources, resulting in sub-optimal volume placement within physical resources of the cloud storage. Such schemes further may actually create problems with storage and/or performance issues on one or more nodes, and may not work in heterogenous cloud computing clusters.

BRIEF DESCRIPTION OF THE DRAWINGS

The present disclosure is best understood from the following detailed description when read with the accompanying figures.

DETAILED DESCRIPTION

Figure 1:
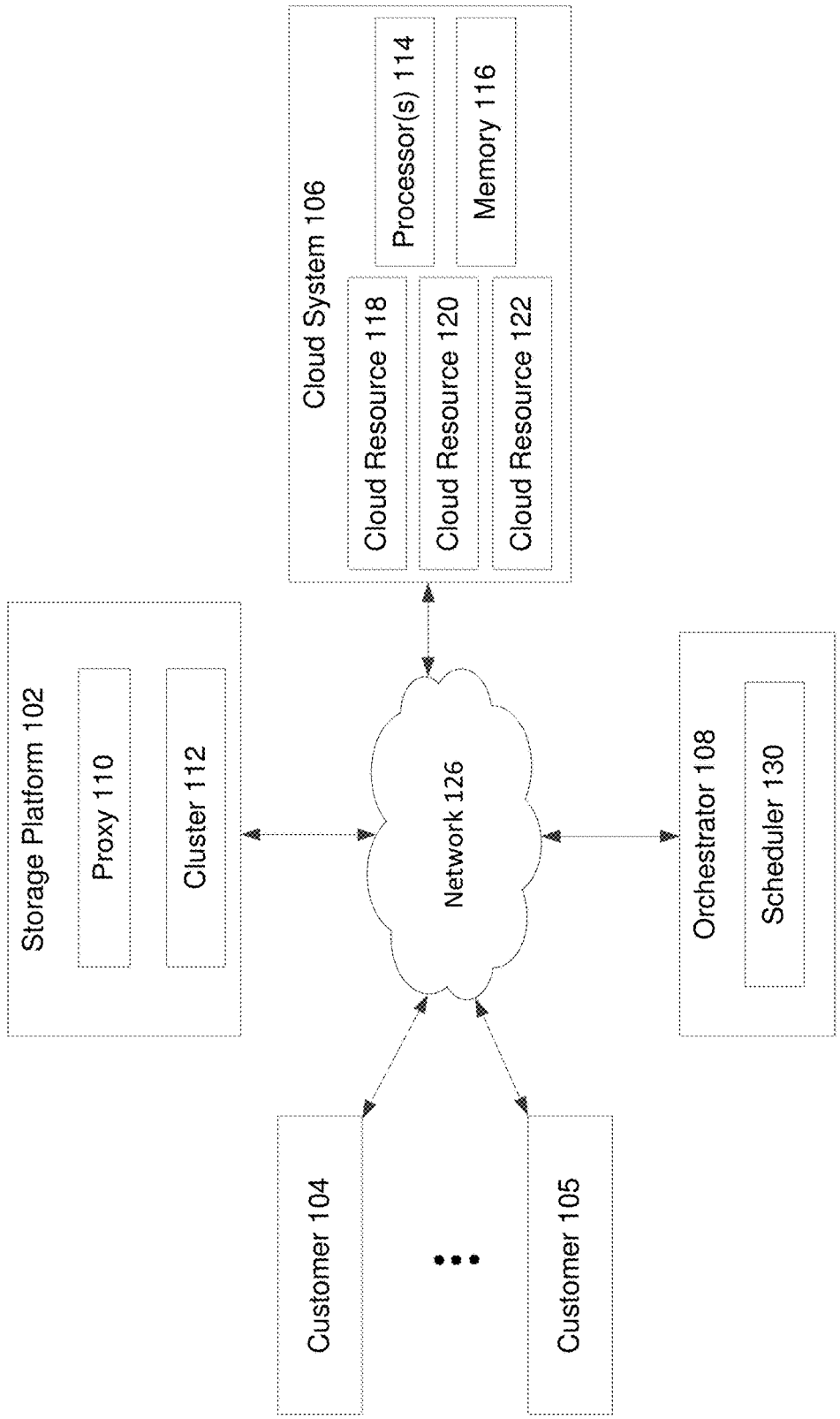
FIG. 1 illustrates a cloud provider environment according to some embodiments of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for retrieving use and limit data for connected resources, determining an optimal location for creating a new volume(s) on a storage platform, and/or creating the new volume and placing it at the determined optimal location. This may be accomplished with a resource tracking component and a volume placement determination component that operate in cooperation with each other as detailed in the examples further below. Embodiments of the present disclosure may be discussed with reference to cloud storage platforms. This is for simplicity of discussion only. Embodiments of the present disclosure are applicable to storage systems generally, such as cloud storage platforms, server storage platforms, on-premise storage platforms, etc. The examples described below may refer to cloud storage platforms to provide illustration of details of the disclosure.

For example, a resource tracking component may track and/or request usage data from resources connected to the storage platform. The resource tracking component may then store the usage data in a database for later retrieval. The resources connected to the cloud storage platform may be hardware and/or software resources. Some examples may include storage resources and networking resources (e.g., switching resources, and/or connection resources). Storage resources may include storage nodes within clusters, where each node may include one or more storage devices. The storage devices may be hard drives, solid state drives, and/or hybrid drives. Switching devices may include network switches connecting the different components of the cloud storage platform. The switching devices may connect the cloud storage platform and a cloud computing system. The connection resources may be one or more client specific networks that may be separated.

As a further example, the volume placement determination component may act in response to the cloud storage platform receiving a request to create or modify a volume. The request may be received from an external system such as, for example, a cloud computing system. Furthermore, the create volume request may include one or more requirements for creating the volume including, for example, capacity, throughput, and/or type of storage. At the cloud storage platform, such as in a management cluster, a volume service may receive the request, package it into an extensible volume placement language schema, and convey that to the volume placement determination component. The volume placement determination component may, in response to this request as packaged into the schema, determine an optimal location to create the requested volume.

To do this, the volume placement determination component may use the information included in the schema to choose a cloud computing cluster, operating cluster, node within the operating cluster, and aggregate (e.g., storage device aggregate). The volume placement determination component may also query the database in which the resource tracking component stored usage and/or limitations data. As a result, the determination may be based on the available resources, the usage data of each of the resources, and/or the requirements given for creating the volume. The optimal location for creating the volume may be optimal according to the cloud storage platform perspective and/or the customer service perspective. For example, from the cloud storage perspective the location of the volume may account for remaining capacity of each storage resource, the type of storage resource, the available throughput of the storage resource, and/or physical proximity of the storage resource to the cloud computing system. In another example, from the customer service perspective an optimal location may account for a location having a faster perceived access by the customer.

After determining an optimal location for creating the volume, the cloud storage platform creates the volume. For example, the volume service may receive the determination from the volume placement determination component and, based on the information returned, create the volume. While description in this simple example has been a request for creation of a volume, embodiments of the present disclosure apply as well to requests to create multiple volumes at the same time, and operate in the same manner as described above and further below.

The above embodiments describe the general architecture discussed in the present disclosure. In another embodiment of the present disclosure, the volume placement determination may be made using a scoring function. A scoring function may be selected from among available scoring functions depending on where the selected scoring function may be suitable for achieving a specific goal. The scoring function may apply a weight to each of the various aspects of the storage resources to make a determination of where to place the volume. For example, a volume that does not require encryption may place a higher weight on non-encrypted resources thereby improving the chance that a non-encrypted resource is selected. In other embodiments of the present disclosure the volume service may select the scoring function to use.

In another embodiment of the present disclosure, the extensible volume placement language schema, mentioned above, may be a volume deployment specification. The volume deployment specification defines a language to be used to describe an optimal location for creating the volume. The language of the volume deployment specification includes reserved keywords for defining the volumes to be placed and requirements of the volumes. Additionally, the language of the volume deployment specification includes labels, or key-value pairs, for further defining constraints on the resource that is to be selected for the location. The language of the volume deployment specification improves the efficiency of requesting the placement of a volume as volumes requiring few, or no, constraints use a smaller input while volumes requiring more constraints use a larger input. For example, a client may be able to input fewer parameters when creating a volume as the volume deployment specification efficiently describes the volume to be placed. At the same time, the language provides the ability to describe complex relationships between the various volumes, such as for example volume groups and affinity/anti-affinity placement. This language decouples the actual client request from the back-end implementation. Where each client may request a volume using a specific API, the volume placement determination component need only understand the volume deployment specification language. The efficiency of the volume placement determination component is improved as it uses the extensible volume deployment specification for describing an optimal location instead of requiring a client to know where the location is.

As a result, cloud storage platforms according to embodiments of the present disclosure utilize available resources better than previous methods for creating volumes. Limits on the use of resources exist and are highly configurable. Providing storage as a service (via the cloud storage platform implementing these exemplary components) on top of physical hardware (such as storage and networking) is improved, because optimal volume placement determinations take many additional variables into account. Some variable examples (also referred to herein as constraints, storage constraints, etc.) include different types of storage hardware and corresponding limits, different capabilities and limits supported by different storage software versions, different networking hardware and corresponding limits, different capabilities and limits supported by networking hardware, sharing of the storage and networking infrastructure by multiple customers and workloads, application specific requirements (e.g., two volumes to not be hosted on the same storage hardware, volumes should be hosted with specific latency requirements, and/or other limitations or requirements). As a result, embodiments of the present disclosure may make optimal volume placement decisions across a fleet of heterogenous storage clusters, while also taking into account the environment's networking capabilities and limits. Taking into account usage and limitations across clusters, as opposed to just within a given cluster, as well as optimizing on specified capabilities (instead of just usage/limits) further improve over existing technology. As a result of embodiments of the present disclosure, operation of storage clusters is improved by reducing instances of networking bottlenecks, processing hotspots, etc., with corresponding improvements in latency, throughput, and performance in general.

FIG. 1 illustrates a cloud provider environment 100 according to some embodiments of the present disclosure. The cloud provider environment 100 may include, among other things, a storage platform 102, one or more customers 104, 105, a cloud system 106, and an orchestrator 108. These aspects of the cloud provider environment 100 may communicate with each other via a network 126. The network 126 may be, for example, the Internet, a local area network, a wide area network, and/or a wireless network (to name a few examples). The network 126 may include a variety of transmission media including cables, optical fibers, wireless routers, firewalls, switches, gateways, and/or other devices to facilitate communications between one or more of the aspects of the environment 100.

Cloud system 106 may be a provider of cloud infrastructure for one or more customers 104, 105 (representing generally any number of customers, with two as a simple example). Cloud system 106 may provide a variety of cloud computing solutions, such as infrastructure as a service (IaaS), software as a service (SaaS), and/or platform as a service (PaaS) as some examples. For example, cloud system 106 may be a public cloud provider, examples of which include Amazon Web Services' (AWS™), Microsoft® Azure®, and Google Cloud Platform™. These are by way of illustration. The cloud system 106 may represent a multi-tenant cloud provider that may host a variety of virtualization tools that customers 104, 105 may request to host or otherwise run one or more applications (e.g., via the network 126 and/or orchestrator 108). Alternatively (or additionally), the cloud system 106 may represent a private cloud provider, such as an enterprise cloud for a given organization.

Cloud system 106, generally, may provide infrastructure including any set of resources used for executing one or more containers, virtual machines, or other hosted virtualization tool(s). Resources may include CPU resources, memory resources, caching resources, storage space resources, communication capacity resources, etc. that a virtualization tool such as a container may use for execution of one or more workloads for customers 104, 105. These resources are illustrated in FIG. 1 as cloud resources 118, 120, and 122 of cloud system 106. These may represent any number of cloud resources in any of a variety of combinations. As just one example, the cloud resources 118-122 may be in the form of one or more AWS EC2™ instances, or other instance type from a cloud provider.

Cloud system 106 may further include a processor 114, which may be one or more processors such as multiple processors. The processor 114 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 114 may also be implemented as a combination of computing devices, e.g., a combination of a DSP and a microprocessor, a plurality of microprocessors, one or more microprocessors in conjunction with a DSP core, or any other such configuration.

The processor 114 may be connected to memory 116 to execute one or more instructions stored in the memory 116 by the processor 114. The memory 116 may include a cache memory (e.g., a cache memory of the processor 114), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 116 includes a non-transitory computer-readable medium. The memory 114 may store, or have recorded thereon, instructions. The instructions may include instructions that, when executed by the processor 114, cause the processor 114 to perform the operations described herein, such as for hosting one or more containers. Instructions may also be referred to as machine executable code. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

For example, a customer 104 (or 105, but referring to 104 for simplicity herein) may run one or more virtualization layers, such as virtual machines and/or containers on one or more cloud resources 118-122 of cloud system 106, via network 126. For example, a container may use a level of system level virtualization, such as by packaging up application code and its dependencies (e.g., system tools, system libraries and/or settings, etc.) so that the hosted application can be executed reliably on one or more computing platforms of the cloud system 106 (as an example). Some examples of software may include, for example, Red Hat® OpenShift®, Docker® containers, chroot, Linux®-VServer, FreeBSD® Jails, HP-UX® Containers (SRP), VMware ThinApp®, etc. Containers may run on the cloud system 106 on a host operating system directly, or may be run via another layer of virtualization (such as within a virtual machine).

Customers 104, 105 may orchestrate one or more containers using the cloud resources 118-122 using orchestrator 108. Orchestration may refer to scheduling containers within a predetermined set of available infrastructure represented by the cloud resources 118-122. The orchestrator 108 may be used to determine the required infrastructure based upon the needs of containers being executed/requested for execution. For example, orchestrator 108 may map each container to a different set of cloud resources 118-122, such as by selecting a set of containers to be deployed on each cloud resource 118-122 that is still available for use. Examples of orchestrator 108 may include Kubernetes®, Docker Swarm®, AWS Elastic Container Service™, etc. Generally, it may refer to a container orchestrator that is executed on a host system of cloud system 106, such as via processor(s) 114 and memory 116, etc., using a host operating system. The orchestrator 108 may further include a scheduler 130. Scheduler 130 may be used make an actual request for infrastructure and allocation of containers to the infrastructure to the cloud system 106. An example of a scheduler 130 may include a Kubernetes® scheduler, which may execute on a host within network 126, either on the same hardware resources as orchestrator 108 or on other hardware and/or software resources.

The environment 100 may further include storage platform 102. Storage platform 102 is illustrated as separate from cloud system 106, though it may be an example of a cloud resource (e.g., cloud resources 118, 120, 122), as storage platform 102 may be hosted and/or managed by a different entity than the cloud system 106 (e.g., a different provider for storage than a public cloud provider), but operate in cooperation with the cloud system 106 to provide storage services to one or more customers 105, 106. The storage platform 102 may include a proxy 110 and a cluster 112, such as, for example, a Kubernetes® cluster or a Docker Swarm®. These may be executed by a processor or multiprocessor (such as one or more of the examples given above with respect to processor 114), memory (such as one or more of the examples given above with respect to memory 116. These may include instructions which, when executed by the processor(s) for the storage platform 102, cause the processor to perform the operations described herein with respect to collecting data on one or more resources, making volume(s) placement determinations (e.g., for one volume, or for multiple volumes created as a group), and/or creating volumes and placing them at the determined locations.

For example, while illustrated as separate from cloud system 106, the cluster 112 may, itself, be hosted by the cloud system 106 as a software-defined environment in which the storage platform 102 may make storage decisions according to embodiments of the present disclosure. In other examples, the storage platform 102 may include its own processor(s), memory(ies), and other resources that interface with the cloud system 106 with the instructions. In yet other examples, the cluster 112 may be hosted on a system that is external to both the storage platform 102 and the cloud system 106. The cloud system 106 and storage platform 102 may be jointly owned or owned by separate entities. The cloud system 106 and storage platform 102 may be co-located to improve storage access speed or they may be located in different data centers. The cloud system 106 and the storage platform 102 may work jointly to provide storage options to customers 104, 105 that are utilizing the capabilities of cloud system 106. The cloud system 106 may provide seamless access to the storage platform 102 for ease of use by the customers 104, 105.

According to embodiments of the present disclosure, storage platform 102 may function as a back-end storage service for cloud system 106. That is, storage platform 102 may support cloud system 106 in providing storage as a service (SaaS) to customers, including customers 104, 105. Storage platform 102 may include a storage operating system (OS) that specializes in providing advanced storage functions, such as deduplication, compression, synchronization, replication, snapshot creation/management, disaster recovery, backup and archive, high availability storage, cloning functionality, data tiering, encryption, multi-platform access, etc. In an example, the storage OS may execute within a storage virtual machine, a hyperscaler, or other computing environment. The storage OS may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by a node, a cloud object, etc.). Each storage object may be associated with a unique identifier that uniquely identifies the storage object. For example, a volume may be associated with a volume identifier uniquely identifying that volume from other volumes. The storage OS also manages client access to the storage objects.

The storage OS may implement a file system for logically organizing data. For example, the storage OS may implement a write anywhere file layout for a volume where modified data for a file may be written to any available location. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.). Other representations may be used instead or in addition. The storage OS may allow client devices to access data (e.g., through cloud system 106 in some examples) stored within the storage platform 102 using various types of protocols, such as a Network File System (NFS) protocol, a Server Message Block (SMB) protocol and Common Internet File System (CIFS), and Internet Small Computer Systems Interface (iSCSI), and/or other protocols.

In some examples, customers 104, 105 using cloud system 106 may request storage via cloud system 106. The cloud system 106 may, in turn, pass the storage request to storage platform 102 for processing and handling. For example, cloud system 106 may offer different storage options to customers 104, 105, including a storage resource available as cloud resource 118/120/122 (where offered/available), which may have limited, if any, functionality as compared to functionality offered by storage platform 102 implementing a storage OS. As another example, the cloud system 106 may specialize in cloud computing resources and storage platform 102 may specialize in cloud storage resources.

Generally, customers 104, 105 that utilize cloud system 106 may require additional storage that is not available as part of the cloud system 106 (or, alternatively, may require storage services in particular that are not available from cloud system 106's resources) but that is nevertheless available through the cloud system 106. This storage (and corresponding storage services) may be provided by storage platform 102 via cloud system 106. For example, in requesting storage, customer 104 may request a specific type of storage from cloud system 106. Cloud system 106 may then pass the request to proxy 110 of storage platform 102 to be fulfilled by cluster 112.

As described herein, the storage platform 102 may provide better optimization of storage for use by customers 104, 105. Depending on a variety of factors, storage platform 102 may fulfill the storage request of customer 104 such that customer 104 does not need to know that storage platform 102 is a different entity from cloud system 106. Customers 104, 105 therefore benefit from the specialized storage capabilities of storage platform 102 without any extra work by customers 104, 105. Such a separation further allows for management of storage systems while accounting for environment capabilities and limits.

For example, a resource tracking component (also referred to herein as a resource tracker) in the cluster 112 may track and/or request usage data from resources connected to the storage platform 102, and store the tracked data in a database. Further, a volume placement determination component (also referred to herein as a volume placement service) in the cluster 112 may act in response to the cloud system 106 receiving a request to create or modify a volume from a customer 104, 105 (which the cloud system 106 passes on to storage platform 102). A volume service in the cluster 112 may receive the request, package it into an extensible volume placement language schema, and convey that to the volume placement determination component. The volume placement determination component may, in response to this request as packaged into the schema, determine an optimal location to create the requested volume using the information included in the schema as well as usage and/or limitation data queried from the database. After determining an optimal location for creating the volume, the volume service may receive the determination from the volume placement determination component and, based on the information returned, create the volume within the storage platform 102.

Volume Placement Architecture

Figure 2A:
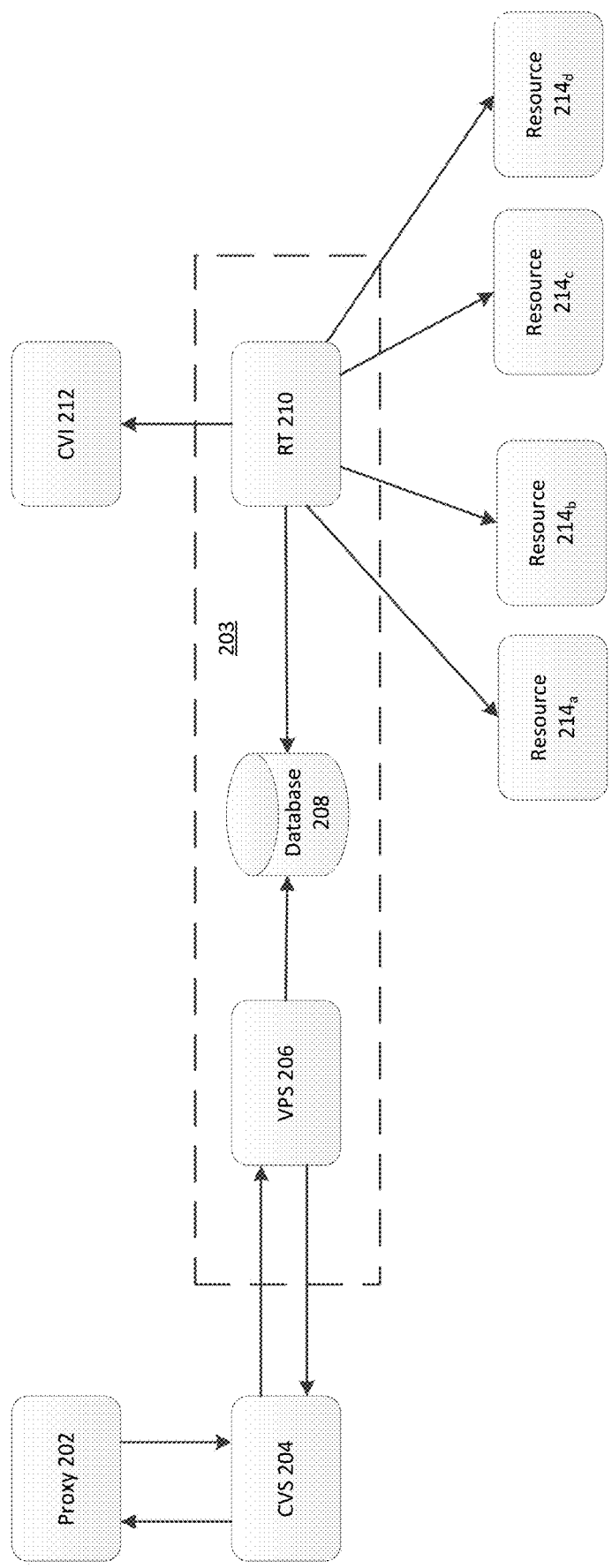
FIGS. 2A-2B illustrate a storage platform architecture according to some embodiments of the present disclosure.

Turning now to FIG. 2A, details of a storage platform 200 are illustrated according to embodiments of the present disclosure. The storage platform 200 may be an example of the storage platform 102 discussed above in FIG. 1. As introduced in FIG. 1, the storage platform 200 may be a back-end storage service for the cloud system 106. The cloud system 106 may communicate with the storage platform 200 through a proxy 202. Proxy 202 may be an example of Proxy 110 illustrated in FIG. 1. Examples of proxy 202 may include a Microsoft Azure Resource Provider or a NetApp Cloud Volume Proxy. Generally, the proxy 202 may provide one or more APIs for the cloud system 106 to communicate with cluster 203 of the storage platform 200.

Cluster 203 may be an example of the cluster 112 described above in FIG. 1. For example, cluster 203 may be a Kubernetes® cluster. In some examples, cluster 203 may be hosted on storage platform 102 (FIG. 1), while in other examples cluster 203 may be hosted in cloud platform 106 (FIG. 1), while in yet other examples cluster 203 may be hosted on a system external to storage platform 102 and cloud platform 106. As illustrated in FIG. 2A, cluster 203 may include a volume placement service (VPS) 206, a database 208, and a resource tracker (RT) 210. In other examples, cluster 203 may further include a cloud volume service (CVS) 204 and cloud volume infrastructure (CVI) tables 212. Cluster 203 may be running in a containerized environment, such as, for example, a Kubernetes® cluster, though other containerized environments are contemplated. In some examples, each component of the storage platform 200 may be running in a separate container that is deployed within the cluster. In some other examples, multiple components of the storage platform 200 may be running in the same container.

Storage platform 200 may further include resources $214_a$-$214_d$ which may be at least one of a storage resource, a switching resource, and/or a connection resource (i.e., endpoints that the RT 210 monitors/tracks). The storage resources may include storage nodes including various storage devices which may include, but not be limited to, hard drives, solid state drives, and hybrid drives. The switching resources may be managed switches connecting the various storage and computing nodes in a network. The connection resources may include a number of individual customer networks defined within the different cloud resources 118-122 and/or storage resources $214_a$-$214_d$.

The proxy 202 may be a single component, either software or hardware, or it may be multiple components (including a combination of software and hardware). That is, there may be multiple proxies 202, where, in an example, there may be one proxy 202 to receive storage requests from a Microsoft® Azure server and there may be another proxy 202 to receive storage requests from an Amazon AWS® server. In other examples, one proxy 202 may receive storage requests from multiple different cloud platforms. Reference will be made to a single proxy 202 for simplicity. The proxy 202 may receive a storage request to create or update a volume. The request may come from a user or from another system, such as, for example, the cloud system 106 of FIG. 1. The proxy 202 may then convert the storage request format to a common storage request format (such as an API call) and send the converted storage request to the CVS 204. The storage request to the CVS 204 may be made through an API published by the CVS 204.

The CVS 204 may provide an API for requesting storage from the storage platform 200. There may be one or more CVS 204 instances within a storage platform, such as for example, the storage platform 200. Additionally, there may be one or more storage platforms, each including one or more CVS 204 instances. The CVS 204 may allow the requestor to select among many different storage options including, but not limited to, volume size, storage speed, storage type, and designating multiple nodes for multiple volumes. The CVS 204 may create or modify the requested volume according to the request received from the proxy 202. The CVS 204 may populate a specification including the specified parameters (also referred to herein as constraints, storage constraints, etc.). The specification may be an example of an extensible volume placement language schema, for example JSON (JavaScript Object Notation) payload referred to herein also as a volume deployment specification (VDS). The VDS functions as the payload sent from the CVS 204 to the VPS 206 to place a volume or set of volumes. Specific details of the VDS will be discussed further below.

The VPS 206 may receive the specification, e.g., VDS, (which packaged the request from the customer 104, 105) from the CVS 204 and determine an optimal location to create or modify the requested volume based on parsing the information from the specification. In some examples, the CVS 204 is included in the cluster 203 with the VPS 206. In the depicted example, the CVS 204 is not included in the cluster 203. The CVS 204 may be part of the storage platform 200 and may communicate with the VPS 206 running in cluster 203. In some examples, cluster 203 may be external to the storage platform 200. In this way, one or more CVS 204 instances within one or more storage platforms 200 may communicate with a single VPS 206 to request volume placement locations. The VPS 206 may provide better informed volume placement locations by having visibility of all the resources within multiple storage platforms and/or clusters. Better informed volume placement locations will improve the overall efficiency and performance of each storage platform as compared to the previous round robin approach used by individual CVS 204 instances for managing volumes.

In some examples there may be a single VPS 206 that provides volume placement locations for a region of storage platforms. In other examples, there may be multiple VPS 206 that coordinate to provide volume placement locations for a region of storage platforms. In some examples, the VPS 206 of a first region communicates and coordinates volume placement with the VPS 206 of a second region. For example, a volume created in the first region may be mirrored in the second region. The creation of the volume and any subsequent changes to the volume (e.g., adding more space) may be coordinated between the VPS 206 of the first region and the VPS 206 of the second region.

The VPS 206 may identify one or more constraints provided in the specification (e.g., by parsing the specification) and may validate any inputs provided by the specification. Validation may include validation of the inputs to identify any invalid keywords, or conflicting entries. In some examples, the VPS 206 may be an image, such as a Docker image, deployed in the cluster 203. There may be any number of VPS pods (e.g., and may be run in different zones from each other), and may be configured to auto-scale should the overall service scale. Upon receiving the specification, the VPS 206 may query the database 208 for usage and limit data of the various resources $214_a$-$214_d$ of the storage platform 200 (e.g., those resources that may be specified by the specification, or all resources across clusters). The resource tracker (RT) 210 may store the usage data in database 208 as discussed below.

Resource limits stored in database 208 may be highly configurable. Resource limits may define percentage utilization of a storage device, bandwidth limits of a storage device, number of volumes available on a storage device, volume grouping on and among storage devices, number of connections in switching resources, total number of customer networks supported, and others. Default values for each resource may be stored in database 208. Additionally, override limits for each resource may be stored in database 208. For example, an override limit on the number of volumes in a storage resource may be used if a volume is consuming a large amount of resources, such as size or bandwidth. The database 208 may be, for example, run as a replica set with multiple replicas (e.g., 3). Such a replica set may provide redundancy and high data availability, with multiple copies of data on multiple servers. Further, replicas may have anti-affinity on zone levels, such that each replica may run in different zones. A replica set may have multiple nodes with data and, optionally, an arbiter node. One of the data bearing nodes for a database 208 may be identified as a primary node, with the others identified as secondary nodes, with writes going through the primary node.

Furthermore, resource data within database 208 may include additional constraints, also referred to as tags and/or labels, to provide flexible use of the data. A tag may define a constraint of the resources such as a type of host, environment type, encryption, etc. For example, a host type may be tagged as a general host for use by any system or it may be tagged as a specific use host to be used in specific applications. As another example, a host may be tagged as an encrypted host, that encrypts all data stored thereon, or as a non-encrypted host. The information within the tags may be provided by CVI tables 212 or by the resource itself. The tag may be stored in database 208 in any suitable manner. In some examples, the tags may be stored as a key-value pair.

Returning to operation of the VPS 206, given the constraints, the resource usage, and the limit data received from the database 208, the VPS 206 may determine an optimal placement of the newly requested volume(s) (i.e., from the received specification). An optimal placement of the requested volume may be determined from a storage perspective and/or a customer experience perspective. From a storage perspective, the placement of the volume may utilize storage resources efficiently and spread the usage across multiple storage resources and/or nodes (including across clusters where applicable). From a customer service perspective, the volume placement may meet the customer requirements as well as be responsive. Further, the VPS 206 may make the determination while taking into account the headroom for the resource(s), such as to not exceed it.

Upon making a determination of volume placement, the VPS 206 may send a message to the CVS 204 identifying the optimal placement location for the requested volume(s) (e.g., one volume, or multiple volumes such as in a group). The payload of the message may include information about where to place the volume(s), whether to create a new storage virtual machine, OS cluster information, node information, and aggregate information as determined by the VPS 206. The CVS 204 may, in response, create the requested volume(s) (and, where appropriate, any storage virtual machine). The CVS 204 may provide a response to the requestor via the proxy 202 (e.g., to the customer 104, 105 via cloud system 106 or directly to customer 104, 105, etc.). In some examples, the response to the requestor may be sent before the volume placement is completed (but information to create the volume is persistently stored somewhere that can be recovered should a failure occur), or sent after the volume placement is completed. In some examples, the CVS 204 may save the placement location to a data store (e.g., database, file, etc.) and provide a response to the requestor without creating the volume. The CVS 204 may use the saved placement location for a future request to create the volume without requesting a new placement location from the VPS 206.

While these operations are occurring (and before and/or after them), the resource tracker (RT) 210 may query each resource 214 for its current usage. In some examples, the RT 210 may query the CVI tables 212 to request information about all available resources, such as one or more resources $214_a$-$214_d$ that relate to one or more resources unique to one or more clusters on the network, such as for example, one or more storage platforms 102 and one or more cloud systems 106. The resource information provided by the CVI tables 212 may include resource location, address, type (e.g., cloud computing cluster and/or OS cluster information, more generally storage resource usage information), and any tags associated with the resource.

While the use of CVI tables 212 is one implementation for providing resource information for the RT 210 to track the resources within one or more clusters, other mechanisms for tracking resources are contemplated. In some examples, resources $214_a$-$214_d$ may be able to self-identify, or self-discover, by directly communicating their presence and location to the RT 210. In some examples, a software delivery engine (SDE) may provide resource information for the RT 210 to track the resources. Additionally, any mechanism that gives the RT 210 knowledge of the resources $214_a$-$214_d$ and the ability to query usage information from the resources $214_a$-$214_d$ is suitable for the purposes of this disclosure. Generally, the RT 210 may know which clusters are connected to each network and which resources are within each cluster.

Given the information from the CVI tables 212, or other discovery mechanism, RT 210 may then query each resource 214 for its current usage to store in database 208. This includes OS resources unique to the storage platform 200. The RT 210 may further query other resource 214 endpoints, such as a cloud volumes network resource (e.g., a module that holds network information for certain cloud provider deployments such as AWS or GCP—more generally, an endpoint that RT relies upon) for network information including usage and limit information. The RT 210 may further query other resource 214 endpoints, such as a direct attach resource provider (e.g., a module that holds network information for an Azure deployment—more generally, another endpoint that RT 210 relies upon) for network information. The cloud volume network or the direct attach resource provider might not be used for respectively different public cloud deployments (i.e., if a specific cloud deployment, one or the other might be used and the remaining not included). As an example, the RT 210 may collect point in time usage from each resource and store it in database 208. In another example, the RT 210 may collect dynamic information from each resource, such as trends, and store the information in the database 208. The data received from each resource may be translated into a generic data format for storage in database 208.

The RT 210 may query each resource for usage information periodically. For example, the RT 210 may query resource $214_a$ every 5 minutes and store the results in database 208. The time between queries may be longer or shorter than 5 minutes. The time between queries may be determined to provide the most up to date and relevant usage data without adding undue burden to the storage platform 200. In other examples, the RT 210 may query each resource on demand, such as in response to a request for a volume being received. In yet other examples, the RT 210 may query some of the resources periodically, and others dynamically, in some combination. By querying resources periodically and storing the responses in database 208, the resources may use fewer compute resources to respond to RT 210 than previous methods in which each CVS 204 requested resource data for each volume change requested.

Volume Placement Scoring

As discussed above, the VPS 206 may determine a volume placement for the newly requested volume(s) based on a variety of parameters. In addition to those listed above and further below, the VPS 206 may further implement a scoring scheme, or scoring function, to determine the optimal placement of the newly requested volume(s). The scoring scheme may include a weighted function which places different weights, or scores, on the different parameters of the potential locations that support the requested set of requirements based on a predetermined priority.

For example, if the specification provides a minimum throughput, the resources may be ranked based on throughput with the resource having a higher throughput receiving a higher score, or weight. While the resource having a higher throughput may receive a higher score, that resource may ultimately not be chosen as the location because of the other parameters specified in the request. As another example, if the specification does not require encryption, then resources without encryption may receive a higher score but a resource having encryption may still be selected. This may help to keep the encrypted resources free for volumes requiring encryption while still allowing the volume to be placed on the encrypted resource if a suitable non-encrypted resource is not found. The scoring scheme may take into account a variety of parameters, such as the examples of constraints noted previously, including for example one or more of different types of storage hardware and corresponding limits, different capabilities and limits supported by different storage software versions, different networking hardware and corresponding limits, different capabilities and limits supported by networking hardware, sharing of the storage and networking infrastructure by multiple customers and workloads, application specific requirements (e.g., two volumes to not be hosted on the same storage hardware, volumes should be hosted with specific latency requirements, and/or other limitations or requirements).

Referring again to FIGS. 2A (and/or 2B, discussed further below), the VPS 206 may include multiple different scoring schemes. A default scoring scheme may be set by the VPS 206. The specification (e.g., VDS) may indicate which scoring scheme to use. In some examples, a list of available scoring schemes may be published for use by the CVS 204 when creating a request. In some examples, the scoring scheme may be a plugin that can be updated by the CVS 204. That is, the CVS 204 may create a new scoring scheme and select the new scoring scheme to be used in determining the optimal location. The scoring scheme allows the VPS 206 to determine an optimal placement location in a flexible, and extendable, manner.

Database 208 may be designed to work with the algorithms used by the VPS 206 to improve access to the stored usage data. Such designs may improve overall efficiency of the storage platform, reduce latency in determining an optimal placement, and improve maintainability of the database 208. For example, database 208 may store the usage data of each resource in a hierarchical manner based on the where the resource exists within the various storage platforms 102 or cloud systems 106. That is, the database 208 may separate the resource usage data based on the topology of the networks, clusters, and systems. In some examples, the data may be separated by cluster level, operating system level (e.g., ONTAP), node level, storage virtual machine (SVM) level, aggregate level, etc.

This may improve overall efficiency of the VPS 206 by allowing the VPS 206 to filter out a resource, including all lower level resources, that do not meet the requirements of the volume request. For example, when making a determination for volume placement the VPS 206 may be able to exclude entire clusters that do not meet the requested requirements without having to check each individual resource within the excluded cluster. The VPS 206 may filter out the resource before applying the scoring function. The remaining resources contain all of the information needed for applying the scoring scheme so the VPS 206 may apply the scoring without another database query. Furthermore, this may improve the maintainability of database 208, allowing for the addition of new functionality with little to no effect on the current data. Designing database 208 as discussed above may improve the speed and efficiency with which the VPS 206 is able to determine the optimal placement of the requested volume(s). Experimentation has shown this design to be remarkably efficient when handling a large amount of unique volume requests.

Volume Deployment Specification

As noted previously, the communication between the CVS 204 and the VPS 206 may occur via a volume deployment specification (VDS). The VDS may be a mechanism for decoupling volume deployment requirements from the underlying storage installations (e.g., cloud provider environment 100 and storage platform architecture 200). As such, the VDS may be considered an extensible language for use in describing, understanding, and making volume placement decisions. The VDS may be implemented using JSON, XML, YAML, or any other data format.

The VDS language provides a framework for defining rules and constraints for placing volumes within multiple heterogeneous storage systems. For example, the schema of the VDS may provide an ability to specify an operating system cluster type to consider/ignore when creating a volume, an ability to specify a list of storage virtual machines to consider when placing a volume, an ability to support multiple volume placement in a single call, and/or an ability to specify affinity/anti-affinity between volumes, as some examples. The VDS may contain a set of constraints to place a volume, filter(s) for volume selection and/or scoring based on certain criteria among a candidate list, etc. Examples of volume placement constraints include requesting two specific volumes together into a single node, requesting that a specific volume go into a specific cluster that is dedicated to a customer, and requesting that a specific volume only go on a network switch that has a specific capability.

The VDS may include several fields. For example, where an incoming request is for placement of two volumes, V1 and V2 (in this example), that request may include several requirements including: V1 and V2 should be placed in a same stock keeping unit (SKU, e.g., a SAP HANA SKU), V1 and V2 should not be placed in the same OS controller (node), V1 requires X capacity and Y throughput, V2 requires W capacity and Z throughput, and V1 and V2 should be part of the same T-carrier (e.g., T2) network. This is just by way of example to illustrate. With these requirements, the VDS that packages these requirements (e.g., as provided from the customer's request via the cloud system 106) may be packaged in a schema as follows:

```
{
    "volumeGroups": [
        {
            "groupid": "GroupUUID1",
            "constraints": {
                "hyperscalerCluster": {
                    "requires": {
                        "networkProximity": "T2Alias"
                    }
                },
                "operatingsystemCluster": {
                    "requires": {
                        "label": ["operatingsystemClusterType":"SKU1"]
                    }
                },
                "node": {
                    "unGroupVolumes": [
                        ["V1 - Allocation UUID", "V2-AllocationUUID"]
                    ]
                }
            },
            "volumes": [
                {
                    "volumeAllocationUUID": "V1-AllocationUUID",
                    "mandatory": "true",
                    "resource": {
                        "capacity": "XGb",
                        "throughput": "YMbps"
                    }
                },
                {
                    "volumeAllocationUUID": "V2-AllocationUUID",
                    "mandatory": "true",
                    "resource": {
                        "capacity": "WGb",
                        "throughput": "ZMbps"
                    }
                }
            ]
        }
    ]
}
```

This is by way of one example only, for purposes of illustration of what a VDS example may look like upon packaging the details of a request from a customer 104, 105. As can be seen in this example, the requirements are packaged in the VDS with the parameters requested, with constraints listed and allocation details of the two volumes V1 and V2 listed. Although the above example is implemented in JSON other formats are contemplated such as, for example, XML, YAML, etc.

As illustrated in the VDS example above, the VDS includes reserved keywords, labels, values, objects, arrays, and units of measurement. Reserved keywords in the example above include "volumeGroups," "groupid," "constraints," "hyperscalarCluster," "requires," "node," "operatingsystemCluster," etc. The reserved keywords form the core of the VDS language, allowing CVS 204 to communicate to VPS 206 the requirements for placing volumes within multiple heterogeneous storage systems. In the example above, the reserved keyword "volumeGroups" indicates a request for locations to place one or more groups of volumes. In this example, there is only one volume group to be placed which may be referenced by the value of the reserved keyword "groupid." In other examples, there may be more than one group of volumes included in the request. Each volume group may include its own unique "groupid." The reserved keyword "constraints" provides additional information about the volume placement request, such as requirements for the type of hyperscaler cluster (e.g., cloud system 106), the requirements for the type of operating system cluster (e.g., storage platform 102), and the requirements for placement on nodes within the operating system cluster. The VDS defines the volumes to be created under the reserved keyword "volumes." In this example, there is an array of two volumes identified as "V1-AllocationUUID" and V2-AllocationUUID." The example VDS defines these volumes as part of a volume group where the group placement includes the requirements defined by the reserved keyword "constraints."

In the above example, the VDS indicates, using the "node" reserved keyword, that the volumes represented by "V1-AllocationUUID" and "V2-AllocationUUID" are to be placed on separate nodes by using the reserved keyword "unGroupVolumes." Furthermore, the VDS makes use of labels, or key-value pairs, to indicate the types of hyperscalar clusters and operating system clusters to use. Labels, also referred to as tags, provide flexibility within the VDS language because they may not need to be defined in VPS 206 for them to be used by VPS 206. In this example, the label "operatingsystemClusterType":"SKU1" may be known by CVS 204 but not known by VPS 206. However, VPS 206 may use labels to identify a suitable location for the requested volumes based on the labels. The information retrieved from the database 208 by VPS 206 may include the labels. These may be used for comparison without needing to understand the context of the labels.

Figure 2B:
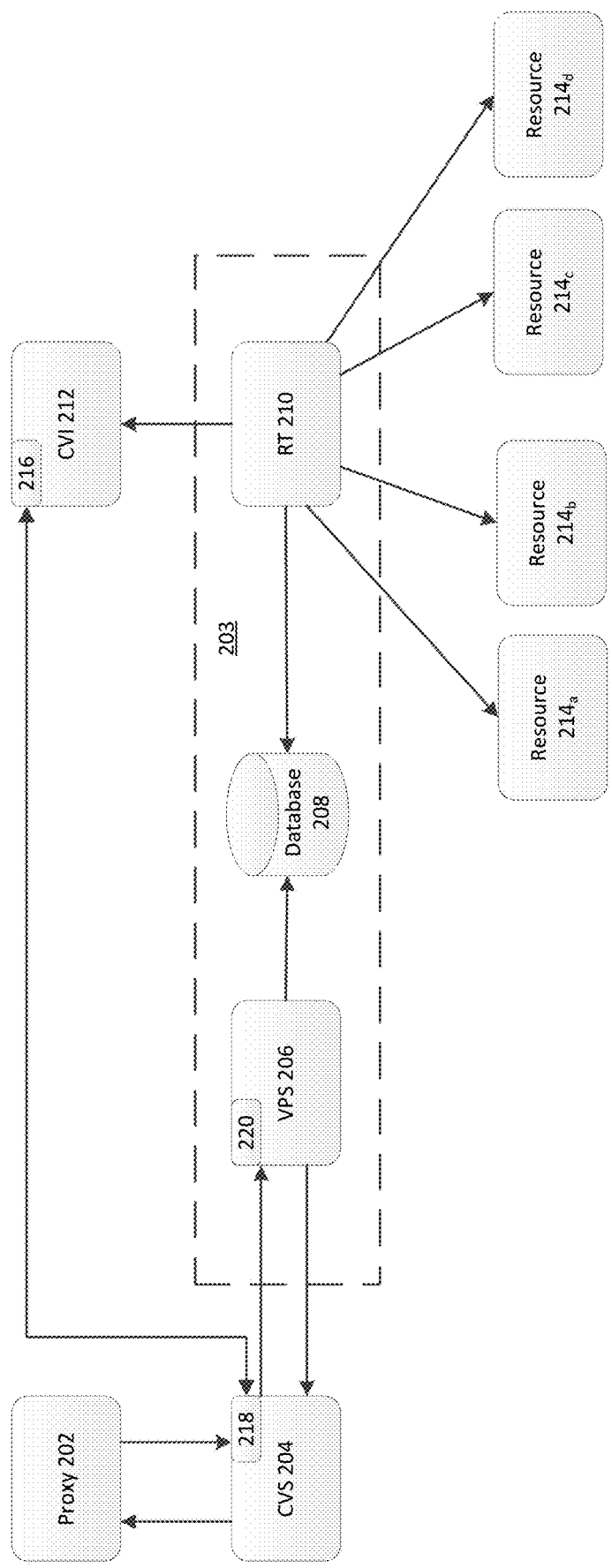

FIG. 2B illustrates additional components of the architecture 200, to aid in the discussion of the VDS, including a label database 216 as part of CVS tables 212, a serviceability engine 218 as part of CVS 218, and an interpreter 220 as part of VPS 206. Label database 216, serviceability engine 218, and interpreter 220 are illustrated as distinct components for illustrative and discussion purposes. For example, label database 216 may not be distinct from the other data stored in CVI tables 212, serviceability engine 218 may be wholly integrated into CVS 204, and interpreter 220 may be wholly integrated into VPS 206.

The information stored in the CVI tables 212 may further include labels (e.g., key-value pairs) in label database 216 to be used by the CVS 204 in creating the volume placement request using the VDS. In some examples, an implementation other than CVI tables 211 may be used to store the labels associated with the different resources 214$_a$-214$_d$. The labels from label database 216 may be retrieved by RT 210 and stored in database 208 along with the usage information. In some examples, RT 210 and database 208 may store the labels without context or understanding of the meaning of the labels.

The serviceability engine, or translator, 218 within CVS 204 may have access to the labels database 216 of CVI tables 212. Translator 218 may use the labels from the labels database 216 in creating the VDS request to be sent to VPS 206. The translator 218 may translate the request from proxy 202 into the abstracted, or generic, format of the VDS. This process decouples the client request for volume placement from the underlying implementation. In some examples, one or more CVS 204 may each receive a request for volume placement from different proxies 202 using different APIs than the other CVS 204. Translating the request into a VDS request may reduce the work required by VPS 206 and improve the efficiency of the storage systems. The abstracted format of the VDS may streamline processing by VPS 206 by not requiring VPS 206 to provide and maintain multiple APIs for request volume placement. CVS 204 may then send the VDS to VPS 206.

Interpreter 220 may receive the VDS request from CVS 204. Interpreter 220 may interpret, or parse, the VDS to extract the information. The extracted information may include reserved keywords, labels, and values associated with each. VPS 206 may use the information from the VDS to determine a location to place each of the requested volume. VPS 206 may match labels included in the VDS with labels stored in database 208. This filtering and matching based on labels, without requiring context or understanding, may allow VPS 206 to place volumes on new types of resources with little to no changes to the code of VPS 206.

FIG. 2B illustrates one example of the interactions between the various components of the storage platform architecture 200 when creating and using a VDS volume placement request, such as the request illustrated above. This illustrates the flexibility of the VDS language in requesting one or more locations for placing volume(s) within multiple heterogeneous storage systems. Another example of a request is provided below to further illustrate the flexibility of the VDS language. In this example, placement for a single volume is requested. The volume requires X capacity and Y throughput. This example request may be packaged in a schema as follows:

{
  "capacity":"XGb",
  "throughput":"YMbps"
}

This is by way of another example to illustrate the flexibility of the VDS language. This example request includes the absolute minimum required information for placing a volume, the storage capacity (e.g., "capacity") and the performance (e.g., "throughput"). In this example, the VDS indicates a request to place one volume having X Gb storage capacity and Y Mbps throughput. As there are no other constraints, VPS 206 may suggest any location that satisfies those two requirements. As seen in these two examples of volume placement requests using the VDS language, the VDS language may efficiently request a single volume with no constraints as well as request the placement of a group of volumes. The VDS language provides the necessary syntax to request placement for any combination of volumes. The flexibility of the VDS language improves the efficiency of communicating volume placement requests and the efficiency of identifying a location. Additionally, the VDS language is highly extensible with little to no code changes on the backend (e.g., VPS 206). Generally, when a new requirement or constraint is desired, a new label (e.g., key-value pair) can be added in the VDS.

Figure 3:
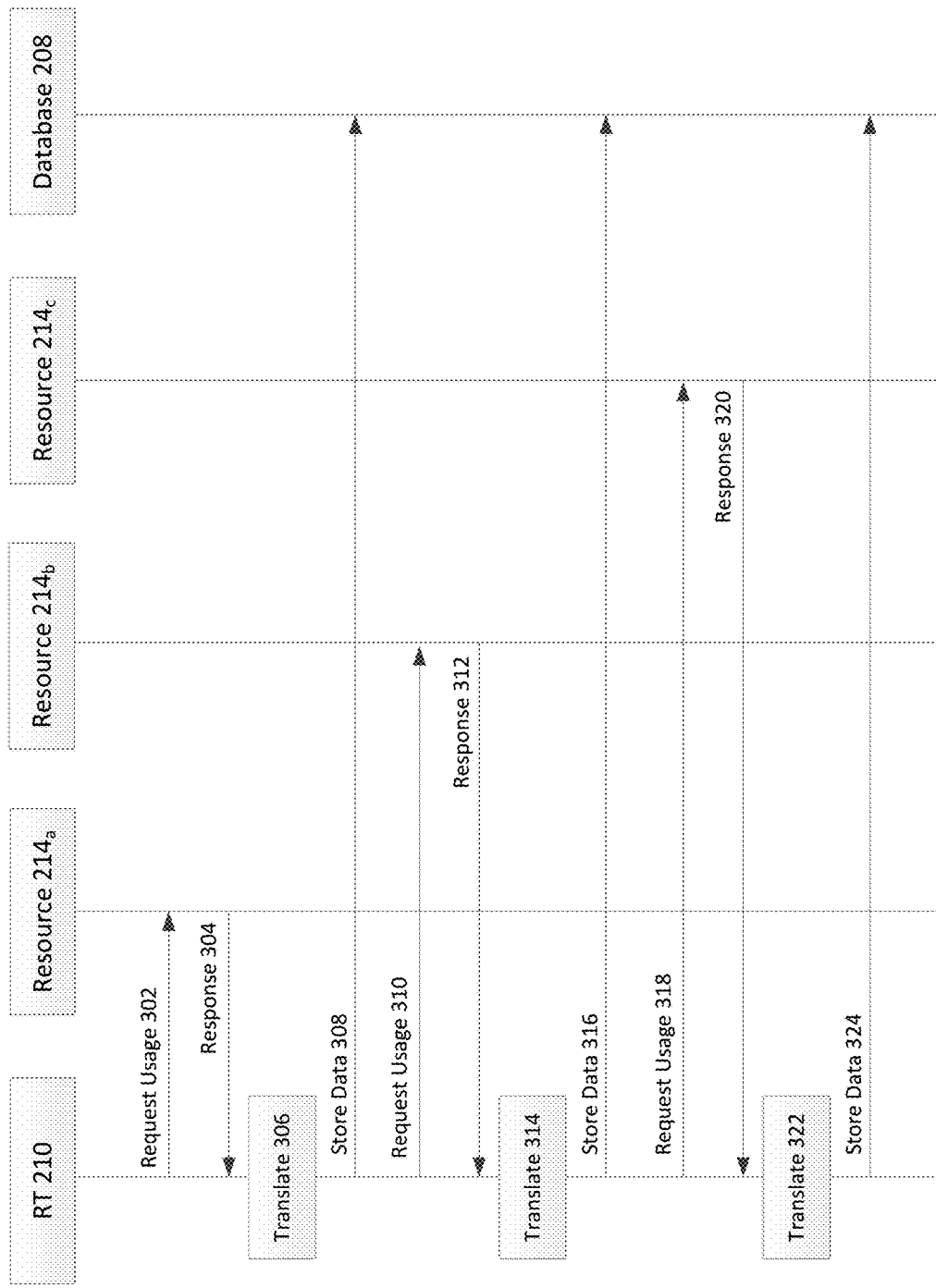
FIG. 3 illustrates an exemplary process flow for resource tracking of multiple resources according to some embodiments of the present disclosure.

Turning now to FIG. 3, an exemplary process flow 300 for tracking usage of multiple resources according to some embodiments of the present disclosure is illustrated. FIG. 3 illustrates the flow 300 between different components of a cluster, such as cluster 203/112 including a resource tracker (RT) 210, a number of resources $214_a$-$214_c$, and a database 208. Resources $214_a$-$214_c$ may be an example of storage resources, switching resources, and/or connections resources as described above with respect to FIG. 1 and FIGS. 2A/2B. RT 210 and Database 208 may be an example of the resource tracker and database, respectively, illustrated in FIGS. 2A/2B.

At action 302, RT 210 may request usage data from the resource $214_a$ (representative of an endpoint more generally). This may be in the form of a query from the RT 210 to the resource $214_a$. In some other examples, the RT 210 may further include several components, including a supervisor component and one or more worker components. The supervisor component of RT 210 may be responsible for creating one or more jobs in a central location that the one or more worker components then process. Examples of jobs (done by the RT 210 in general, or by worker components in particular) include querying CVI 212 to fetch all available resources (including cloud computing cluster and/or OS cluster resources), fetch usage from OS clusters (including, for example, usage for OS cluster and resources underneath that), and/or fetch network usage.

While the RT 210 may query (in some examples with the worker component(s)) OS cluster resources, in some examples this may result in just resource usage information. Accordingly, the RT 210 may maintain its own table (such as in database 208) for corresponding limits for the OS cluster resources. Further, RT 210 may categorize the usage and limits based on different levels of scope, such as a cloud computing cluster level, an OS cluster level, a node level, and/or an aggregate level. For each level of scope, the RT 210 may maintain limit types such as default limits and/or override limits. A default limit may refer to a limit considered by default for a given resource. When a new hardware and/or software version is introduced to the system, then this information may be added to a default limit table with the other default limits. Such default limits may be a direct representation from OS hardware, which may be defined by the OS provider. Override limits may refer to limits that may be overridden, and may include default limits as well as a few additional network-related limits. Volume placement might be kept from exceeding override limits in some examples.

Where the RT 210 includes supervisor and worker components, the supervisor component may query the database 208 to fetch a list of all OS clusters, and for each cluster create a job in the central location that respective worker components may take. The worker components may then query the usage (and limit, where available) information from the endpoints like OS endpoints or other cloud provider endpoints such as those possible discussed above.

At action 304, resource $214_a$ may respond to the request with usage data. As discussed above, in one example, the usage data may be point in time usage data. In another example, the usage data may be dynamic usage data. The usage data may be provided in the format of the specific resource type. Further, this data may be queried periodically, such as on the order of 5 minutes. The periodicity may be modified, such that querying may occur more frequently or less frequently according to configuration. The query at action 302, and response at action 304, may occur via one or more APIs exposed by the resource $214_a$ (e.g., an endpoint generally).

At action 306, the RT 210 may translate the received usage data to a generic format, such as according to a defined schema (e.g., a JSON format). The generic format may allow the usage data and/or limit data from each different type of resource to be stored in a similar manner to make the data easier to work with.

At action 308, the RT 210 may store the translated usage data from resource $214_a$ to database 208.

Actions 310-316 may be the same as actions 302-308, except that the usage data is provided by resource $214_b$ instead of resource $214_a$. Further, actions 318-324 may be the same as actions 302-308, except that the usage data is provided by resource 214 instead of resource $214_a$. Such actions may occur, for example, by the RT 210 generally, or by supervisor and worker components in particular as discussed. In some examples, actions 310-316 may occur at the same time as actions 302-308, while in other examples one may occur after the other, or in yet other examples they may partially overlap in time. Similarly, actions 318-324 may occur at the same time as actions 302-308 and/or 310-316, while in other examples one may occur after the other, or in yet other examples they may partially overlap in time.

Figure 4:
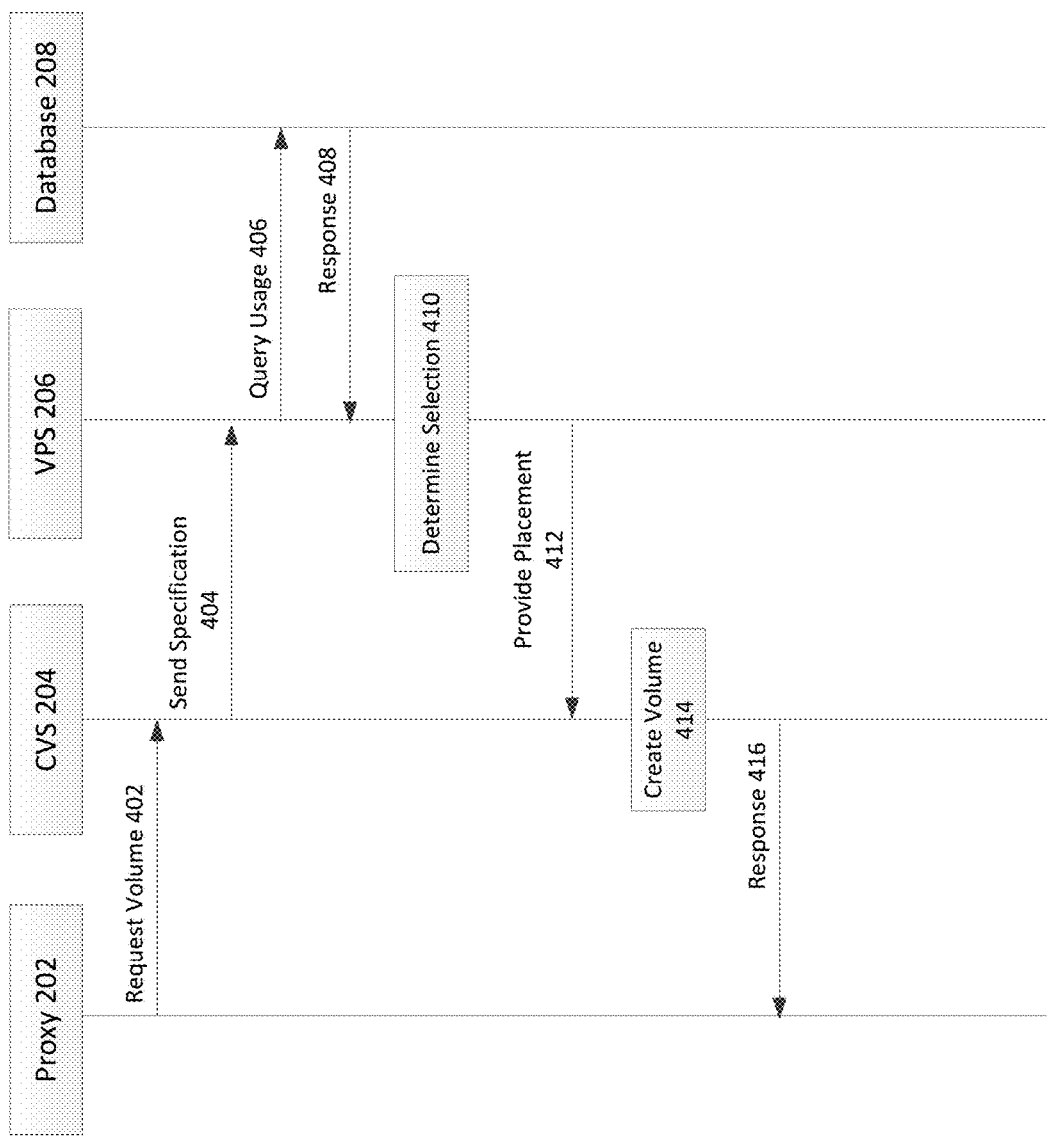
FIG. 4 illustrates an exemplary process flow for volume placement selection and creation among resources according to some embodiments of the present disclosure.

Turning now to FIG. 4, an exemplary process flow 400 for selecting an optimal placement location for a requested volume according to some embodiments of the present disclosure is illustrated. FIG. 4 illustrates the flow 400 between different components of a storage platform 200/102 including the proxy 202, and components of a cluster, such as cluster 203/112 including the cloud volume service (CVS) 204, the volume placement service (VPS) 206, and the database 208. While described with respect to a single volume, the actions illustrated in FIG. 4 equally apply to requests to create multiple volumes at the same time.

At action 402, the proxy 202 may request a volume be created and/or placed by sending the request to CVS 204 (e.g., via an API call). In another example, the proxy 202 may request that a volume be modified. In another example, the proxy 202 may request a placement for a volume without creating or modifying the volume. The proxy 202 may receive and processes the request from another system, such as cloud system 106 described above in FIG. 1. The request may contain a number of different parameters including, but not limited to, volume capacity, volume throughput, volume location relative to the compute cluster (e.g., co-located storage), and/or whether it can be on the same node as another volume. In some examples, the request to create and/or place the volume is associated with an existing volume allocation. In such cases, the CVS 204 may retrieve previously stored allocation information (e.g., from a database) and use the placement information from that allocation to create and/or place the volume. If the previous volume allocation is found, the CVS 204 may proceed to action 416 and respond to the request. If, instead, the previous volume allocation is not found, the CVS 204 may proceed to action 404 to request a placement location.

At action 404, the CVS 204 may send a specification (e.g., a VDS) containing the requested volume parameters to the VPS 206. The specification may include some or all of the requirements requested by the proxy 202. The specification may be formatted in a generic format such as, for example, JSON or XML.

At action 406, the VPS 206 may send a query to database 208 requesting resource usage and/or limits data. In an example, the resource usage data is stored in database 208 as discussed above with respect to FIG. 2A and FIG. 3, including for example usage data obtained periodically and/or dynamically from one or more endpoints, as well as limits data either obtained from those endpoints, or maintained by the RT 210 in the database 208 on behalf of the endpoints, or some combination of the above.

At action 408, the database 208 may respond with the resource usage data to the requesting VPS 206.

At action 410, the VPS 206 may determine an optimal placement for the requested volume based on the usage data, limits data, and/or the information in the specification sent as the request from the CVS 204. As discussed above, the information in the specification may include constraints, or tags, and/or a selected scoring scheme. As discussed above, the optimal placement may be optimal from one or both of the storage platform perspective and the customer service perspective. In an example of optimal placement from the cloud storage perspective, the VPS 206 may account for the remaining capacity of each storage resource, the type of storage resource, the available throughput of the storage resource, and/or the physical proximity of the storage resource to the cloud computing system. In an example of optimal placement from the customer service perspective, the VPS 206 may account for one location having a faster perceived access by the customer as compared to another location. The optimal placement may be determined in part by comparing the requested requirements for the volume and resource usage received.

At action 412, the VPS 206 may respond to the CVS 204 with the optimal placement, as determined at action 410, for the volume. For example, the VPS 206 may send to the CVS 204 payload information including which cluster/node/aggregate to create/place the volume on, whether to create a new storage virtual machine, OS cluster information, node information, and aggregate information as determined by the VPS 206.

At action 414, the CVS 204 may create the requested volume according to the optimal placement information provided by the VPS 206. The CVS 204 may also, where appropriate, create any storage virtual machine for the volume(s) as well. In some examples, where the initial request was a volume placement request, the CVS 204 may store the placement information for later use (e.g., as part of the information stored for a volume allocation). The placement information may be stored in a database, as a file, or as an object as some examples.

At action 416, the CVS 204 may send a response to the proxy 202 indicating that the volume has been created. In some examples, the response may indicate that a location was identified for placing the volume without creating the volume. This response may then be routed to the customer 104, 105 via the cloud system 106 or may bypass the cloud system 106.

Figure 5:
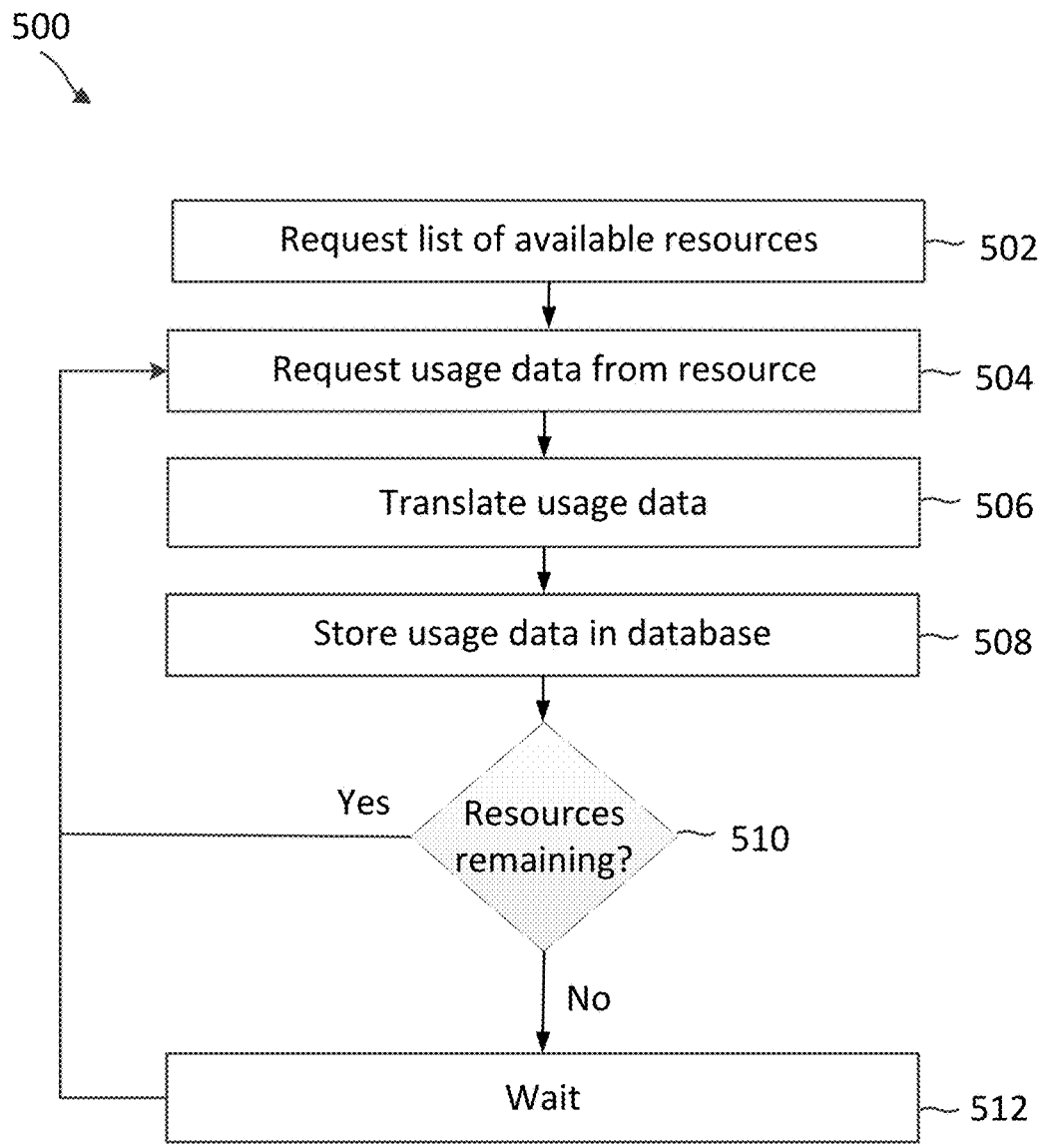
FIG. 5 illustrates a method for resource tracking of multiple storage resources according to some embodiments of the present disclosure.

Turning now to FIG. 5, a flow diagram of resource tracking according to some embodiments of the present disclosure is illustrated. In the description of FIG. 5, reference is made to elements of FIG. 1 and FIGS. 2A/2B for simplicity of illustration. In an embodiment, the method 500 may be implemented by an exemplary resource tracker (RT) 202. It is understood that additional steps can be provided before, during, and after the steps of method 500, and that some of the steps described can be replaced or eliminated for other embodiments of the method 500.

At block 502, RT 202 requests a list of available resources from CVI tables 212. The list of available resources contains the information needed for the RT 202 to address each OS resource endpoint and know what type of data to expect to receive. For other resource endpoint types, such as cloud volumes network resources and/or direct attach resource providers, block 502 may be skipped as the information for those endpoints might not be maintained by CVI 212.

At block 504, RT 202 requests usage data from a first resource. In one example, this may be resource $214_a$ as described above with respect to FIGS. 2A/2B and FIG. 3. This may involve the supervisor and worker components as noted with respect to FIG. 3, or in other examples the RT 210 generally.

At block 506, RT 202 translates the usage data received from the resource to a generic format. Translating the usage data to a generic format simplifies the storage of the usage data. Additionally, the use of a similar generic format simplifies comparison of usage data across different types of resources.

At block 508, the usage data (e.g., as translated at block 506) is stored in a database. In one example, the database may be the database 208 described above in FIGS. 2A/2B.

At block 510, determines whether there are any resource endpoints remaining that have not been queried. If it is determined that there are resources remaining to be queried, then the method 500 returns to block 504 and repeats blocks 504-508 with the next resource.

If, instead, it is determined that there are no resources remaining to be queried, then the method 500 proceeds to block 512.

At block 512, the method 500 waits a predetermined period of time. In one example, the method 500 may wait for 5 minutes. In another example, the method 500 may wait for more or less time (and, as noted previously, the wait time may be modified). In other examples, the wait may not be a period of time, but rather a wait until a dynamic request is received as a trigger. After the wait period is finished, the method 500 returns to block 504 to query the usage of each resource again and may proceed as discussed above generally. One or more resources may be fully booked and not be able to accept more work, such as for example, another volume, connection, etc. In some examples, the method 500 may continue to query resource usage even after the resource is fully booked in order to maintain an accurate account of available resources as resource usage changes (e.g., volume deleted, volume resized, connection removed, etc.)

Figure 6:
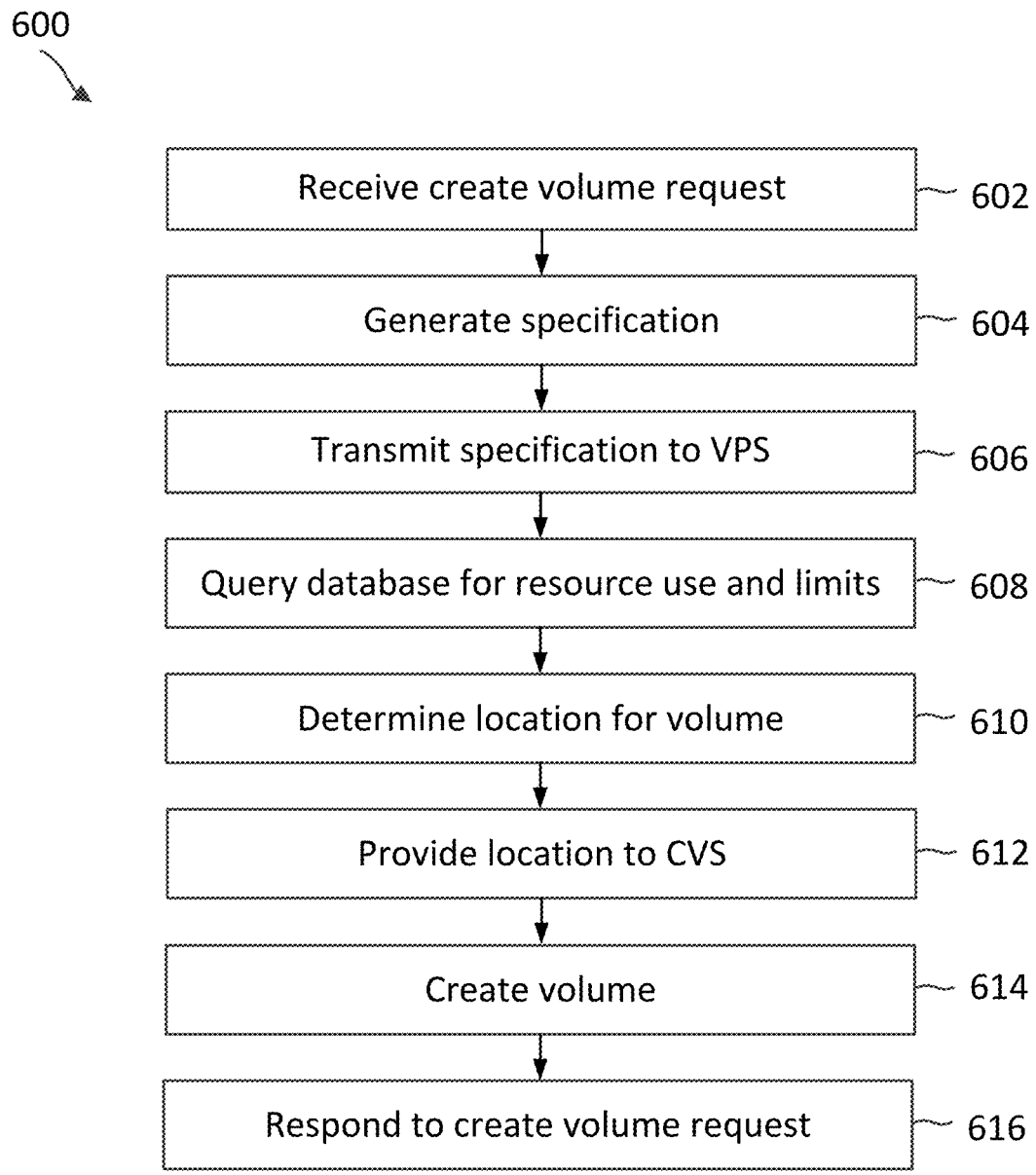
FIG. 6 illustrates a method for volume placement selection and creation among storage resources according to some embodiments of the present disclosure.

Turning now to FIG. 6, a flow diagram of selecting a placement for a volume according to some embodiments of the present disclosure is illustrated. In the description of FIG. 6, reference is made to elements of FIG. 1 and FIGS. 2A/2B for simplicity of illustration. In an embodiment, the method 600 may be implemented by an exemplary storage platform 102. In particular, the method 600 may be implemented by a cluster, such as a Kubernetes® cluster, of the storage platform 102 (which may be hosted by cloud system 106 or separately by storage platform 102). It is understood that additional steps can be provided before, during, and after the steps of method 600, and that some of the steps described can be replaced or eliminated for other embodiments of the method 600.

At block 602, the cluster receives a create volume request. In another example, the cluster may receive a modify volume request. In another example, the cluster may receive a request for a volume placement without creating or modifying the volume. The create volume request may be received from a customer or system outside of the exemplary storage platform, which is routed to the cluster for processing. The request may be received at an external interface such as, for example, proxy 202 of storage platform 200. In some examples, the create volume request is associated with a previous volume allocation. In such examples, if the cluster finds placement information from the existing allocation, the method 600 may proceed to block 614 and create the volume. Otherwise, the method 600 proceeds to block 604.

At block 604, the cluster packages the information included in the request received at block 602 into a specification containing all of the information for the requested volume. In an example, the specification may in a JSON format (e.g., a VDS per examples above). In another example, the specification may be in an XML format. The packaging of the request information into a specification may be performed by a CVS 204 within the cluster.

At block 606, the cluster transmits the specification to a volume placement service within the cluster (e.g., from CVS 204). In one example, the volume placement service may be VPS 206 described above with respect to FIGS. 2A/2B and FIG. 4.

At block 608, the cluster queries a database for usage and limit information for all available resources. The database may be, for example, database 208 described above with respect to FIGS. 2A/2B and FIG. 4.

At block 610, the cluster determines an optimal location for the requested volume. As described above, the optimal location may be viewed from the storage platform perspective and/or the customer service perspective. The cluster may consider the requested volume requirements and the resource usage and limits when determining the optimal placement for the volume. Some examples of variables the cluster (e.g., the VPS 206) takes into account when making the determination include different types of storage hardware and corresponding limits, different capabilities and limits supported by different storage software versions, different networking hardware and corresponding limits, different capabilities and limits supported by networking hardware, sharing of the storage and networking infrastructure by multiple customers and workloads, application specific requirements (e.g., two volumes to not be hosted on the same storage hardware, volumes should be hosted with specific latency requirements, and/or other limitations or requirements). The cluster (e.g., cluster 203 including VPS 206) may additionally use a scoring scheme to determine the optimal placement, as discussed above. As a result, embodiments of the present disclosure may make optimal volume placement decisions across a fleet of heterogenous storage clusters, while also taking into account the environment's networking capabilities and limits.

At block 612, the cluster provides the determined optimal volume location from the VPS 206 to the CVS 204. In an alternative example, the cluster may not find an existing location to place the requested volume. The cluster may respond with information to create a new resource to place the volume. Alternatively, the cluster may respond with an error indicating that a suitable location was not found. The following discussion will proceed with the discussion of the examples where an optimal location is identified by the VPS 206.

At block 614, the cluster creates the volume and places it at the chosen location. This may include one requested volume, or multiple if requested. In some examples, such as a volume placement request, the cluster may store the chosen location (e.g., in a database or file) for later use with a separate request to create the volume from the volume placement request.

At block 616, the cluster sends a response to the create volume request via the proxy back to the customer 104, 105, such as via the cloud system 106 or bypassing cloud system 106.

Figure 7:
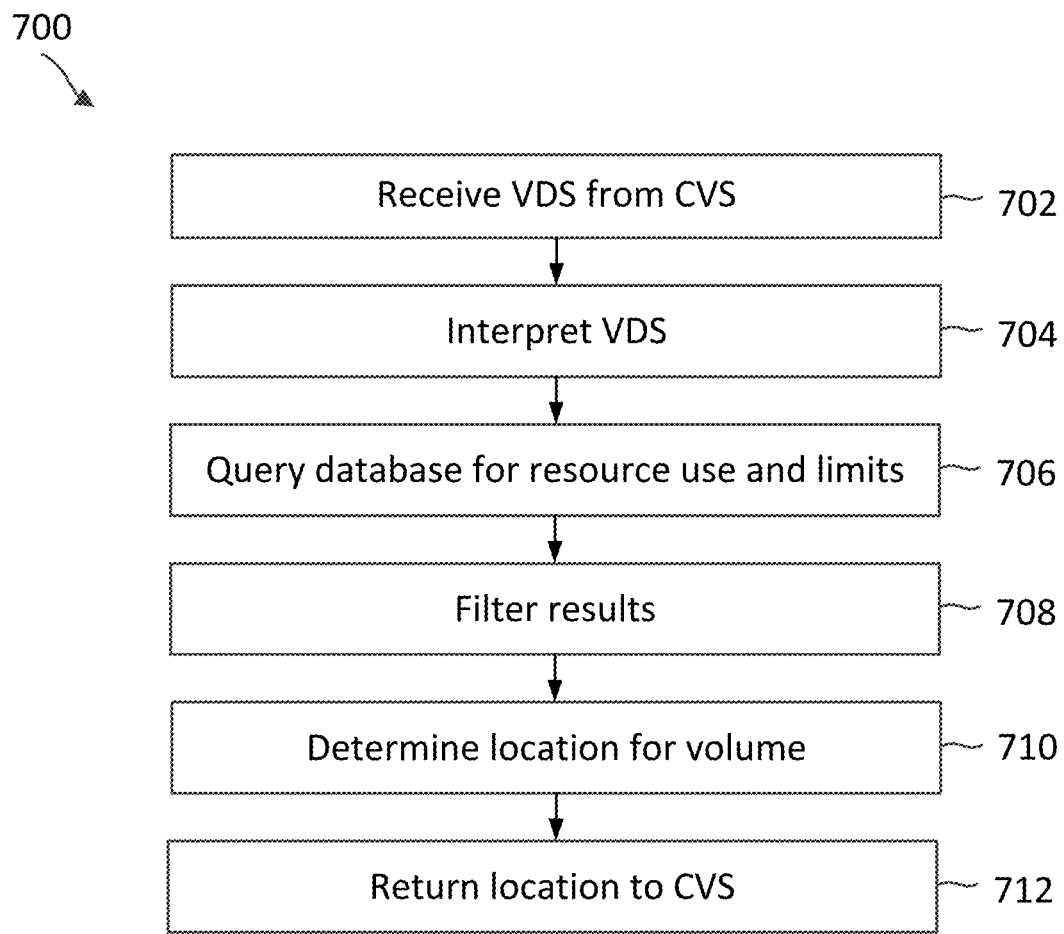
FIG. 7 illustrates a method for identifying a location to place a volume according to some embodiments of the present disclosure.

Turning now to FIG. 7, a flow diagram of selecting a placement for a volume according to some embodiments of the present disclosure is illustrated. In the description of FIG. 7, reference is made to elements of FIG. 1 and FIGS. 2A/2B for simplicity of illustration. In an embodiment, the method 700 may be implemented by an exemplary storage platform architecture 200. In particular, the method 700 may be implemented by a cluster (e.g., cluster 203) such as a Kubernetes® cluster, of the storage platform architecture 200 (which may be hosted by cloud system 106 or separately by storage platform 102). It is understood that additional steps can be provided before, during, and after the steps of method 700, and that some of the steps described can be replaced or eliminated for other embodiments of the method 700.

At block 702, the cluster receives a volume deployment specification (VDS) from a cloud volume service (CVS). In some examples, the cluster may receive a VDS from more than one CVS at a time. In some examples, the VDS may be received by a volume placement service (VPS) within the cluster. In some alternative examples, the cluster may receive a request for volume placement in a format different than the VDS. However, for simplicity and clarity, the discussion below will focus on receiving the request as a VDS.

At block 704, the cluster interprets the VDS. In some examples, interpreting the VDS includes parsing the VDS to identify the reserved keywords, labels, and their associated values. In some examples, a VPS may perform the interpretation. In some examples, a separate interpreter module may perform the interpretation.

At block 706, the cluster queries a database for resource usage and limits. In some embodiments, the database may be part of the cluster. The results may be provided in a hierarchical format. In some embodiments, the provided results may include labels and/or key-value pairs for use in identifying a suitable location to place the requested volume.

At block 708, the cluster filters the results from the database. In some examples, the results may be filtered based on the constraints provided in the VDS. In some examples, the cluster may filter out a resource at a higher level (e.g., hyperscaler cluster) and all lower level resources (e.g., node) based on a single constraint. In some examples, the filtering may be more efficient because of the hierarchical format of the returned results.

At block 710, the cluster determines a suitable location for the requested volume. The location may satisfy all of the constraints provided in the VDS. The cluster may filter the resource information from the database to reduce the number of potential location. The cluster may then use a scoring function, or scoring scheme, on the reduced number of potential locations to determine the suitable location. In some alternative examples, the location may be determined using a scoring function without first filtering the resource information. In some other alternative examples, the location may be determined by filtering the resource information from the database without using a scoring function. In some examples, another method may be used for determining a location for the volume.

At block 712, the cluster returns the determined location to the requesting CVS. The cluster may return a location for each volume included in the VDS.

Figure 8:
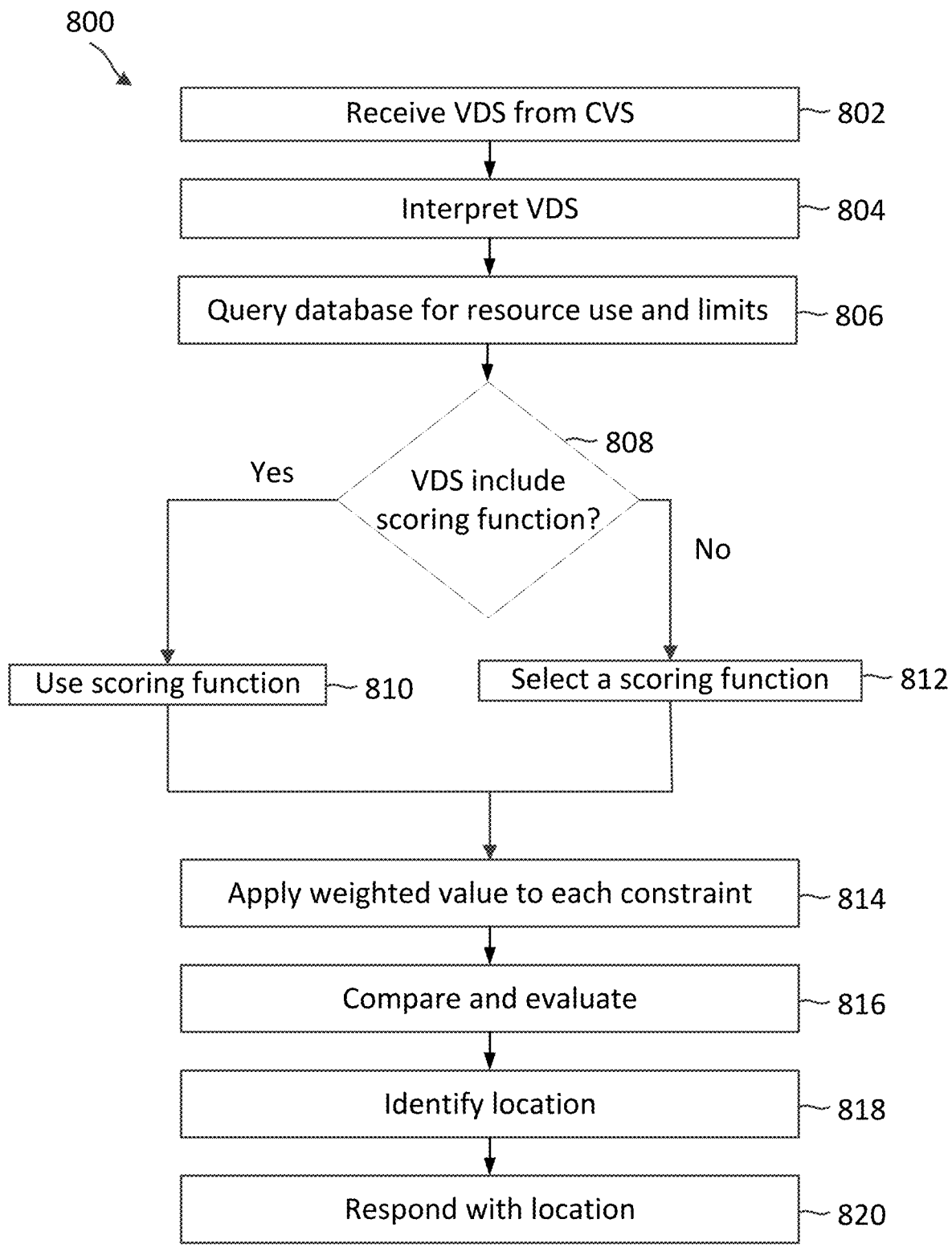
FIG. 8 illustrates a method for using a scoring function in identifying a location to place a volume according to embodiments of the present disclosure.

Turning now to FIG. 8, a flow diagram of using a scoring function, or scoring scheme, for selecting a placement for a volume according to some embodiments of the present disclosure is illustrated. In the description of FIG. 8, reference is made to elements of FIG. 1 and FIGS. 2A/2B for simplicity of illustration. In an embodiment, the method 800 may be implemented by an exemplary storage platform 102. In particular, the method 800 may be implemented by a cluster, such as a Kubernetes® cluster, of the storage platform 102 (which may be hosted by cloud system 106 or separately by storage platform 102). It is understood that additional steps can be provided before, during, and after the steps of method 800, and that some of the steps described can be replaced or eliminated for other embodiments of the method 800.

At block 802, the cluster receives a volume deployment specification (VDS) from a cloud volume service (CVS). The VDS may include a request to place one or more volumes in one or more heterogenous storage systems. The VDS may include constraints and requirements for placing the one or more volumes. In some examples, the VDS may include an indication of a scoring function to use for deciding where to place the one or more volumes. In some examples, the VDS may include a scoring function to be used for deciding where to place the one or more volumes. In some examples, the VDS does not include an indication of a scoring function to be used.

At block 804, the cluster interprets the VDS. In some examples, a volume placement service (VPS) may interpret the VDS. In some examples, a separate VDS interpreter component may interpret the VDS. In some examples, interpreting the VDS includes parsing the VDS to identify the requirements and constraints for placing the requested volumes. The requirements and constraints may be defined using reserved keywords and labels in the VDS.

At block 806, the cluster retrieves resource use and limit data from a database. In some examples, the data is formatted in a hierarchical format (e.g., hyperscaler cluster, operating system cluster, aggregate, node). The data may include labels for each resource and resource type to be used for filtering the resource data and/or applying the scoring function. In some examples, the cluster may filter the resource data based on the constraints within VDS. An example of filtering is discussed above with respect to block 708 of FIG. 7.

At decision block 808, the cluster determines whether the VDS includes an indication of which scoring function to use. For example, more than one scoring function may be available with each scoring function being optimized for a different performance target. The VDS may include an indication of which scoring function based on the preferred performance target. In an alternative example, the VDS may not include an indication of which scoring function to use when the cluster does not provide multiple scoring functions. In another example, the VDS may not include an indication of which scoring function when the cluster provides a default scoring function. If the cluster determines that the VDS includes an indication of which scoring function to use, or defines a scoring function, the method 800 proceeds to block 810.

At block 810, the cluster selects the scoring function identified in the VDS for use. In some examples, the VDS may indicate a scoring function to use that is defined in the cluster. In some examples, the VDS may include a scoring function that is not defined in the cluster along with an indication to use the included scoring function.

If, instead, at decision block 808 the cluster determines that the VDS does not include a scoring function, the method 800 proceeds to block 812.

At block 812, the cluster selects a scoring function to use. In some examples, a default scoring function is defined and selected for use. In some examples, the default scoring function may be different for different types of requests. For example, a first scoring function may be used when a request to place a single volume is received and a second scoring function may be used when the request includes a group of volumes to be placed.

At block 814, the cluster applies a weighted value to each resource based on a constraint identified in the VDS. In some examples, the cluster may apply a weighted value to each resource that has not been filtered out. The weighted values used may be defined in the scoring function. In some examples, the scoring function may define a weighted value for each possible constraint. In some examples, the scoring function may define weighted values for a subset of constraints according to the desired goal of the scoring function. In some examples, possible locations may be removed, or filtered out, based on the requirements and constraints before applying the weighted values. For example, the VDS may specify that the operating system cluster have a specific label (e.g., SKU1). All operating system clusters that do not have the specified label may be removed from the list of available locations.

At block 816, the cluster compares and evaluates the weighted scores of the resources for each constraint or constraint type. In some examples, the comparison may include finding the sum of all of the scores for each resource. In some examples, the comparison may include finding the sum of the scores for the constraints included in the VDS. This may be repeated for each volume placement request in the VDS.

At block 818, the cluster identifies a location for each of the one or more volumes based on the scoring function. In some examples, the location with the highest weight, or score, may be selected. In some examples, a location not having the highest weight, or score, may be selected. For example, when identifying locations for groups of volumes, a location that does not have the highest score may be better suited to place one of the volumes based on other constraints identified in the VDS.

At block 820, the cluster responds to the CVS with a location for each volume placement request in the VDS.

Figure 9A:
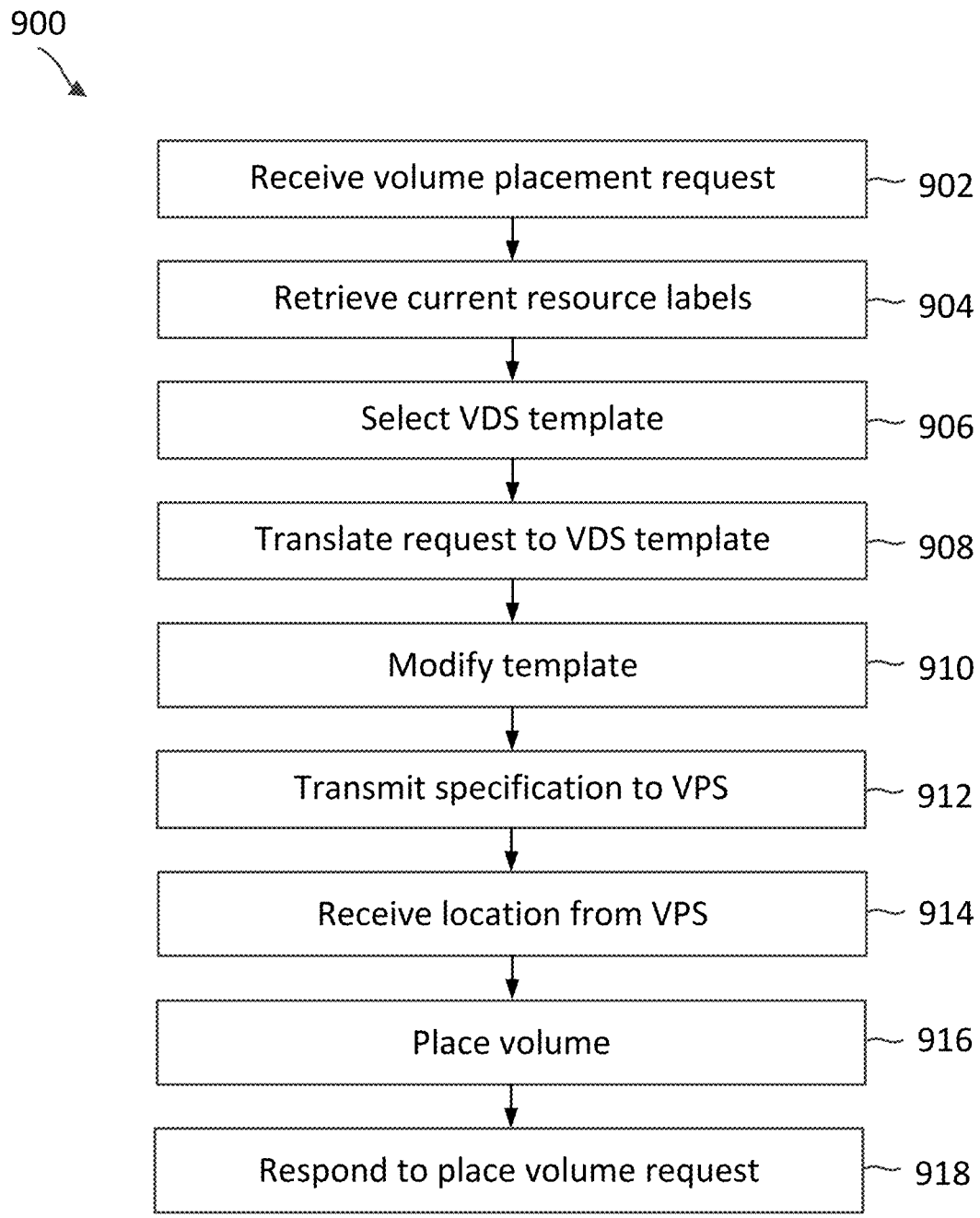
FIGS. 9A-9B illustrate methods for using a volume deployment specification for requesting placement of a volume according to embodiments of the present disclosure.
Figure 9B:
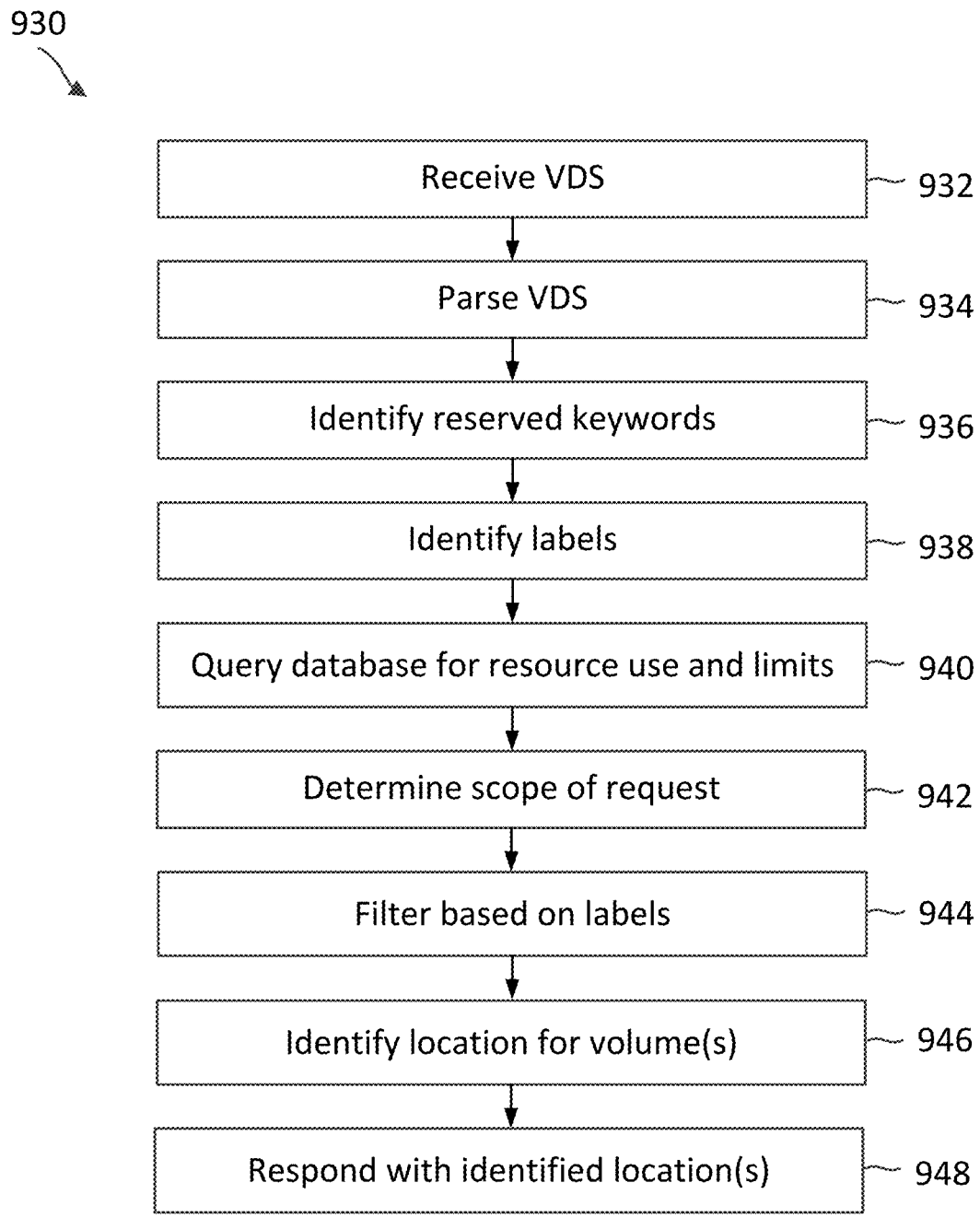

FIGS. 9A-9B illustrate flow diagrams of using a volume deployment specification (VDS) for requesting placement of one or more volumes according to some embodiments of the present disclosure. In the descriptions of FIGS. 9A-9B, reference is made to elements of FIG. 1 and FIGS. 2A/2B for simplicity of illustration.

Turning to FIG. 9A, in an embodiment, the method 900 may be implemented by an exemplary storage platform 102. In particular, the method 900 may be implemented by a cluster, such as a Kubernetes® cluster, of the storage platform 102 (which may be hosted by cloud system 106 or separately by storage platform 102). Specifically, the method 900 may be implemented by a cloud volume service (CVS) running in a cluster. It is understood that additional steps can be provided before, during, and after the steps of method 900, and that some of the steps described can be replaced or eliminated for other embodiments of the method 900.

At block 902, the CVS receives a request to place one or more volumes in one or more heterogeneous storage systems. The request may include storage capacity and throughput requirements for each of the volumes. In some examples, the request may include constraints on the placement of each volume, such as for example, the type of hyperscaler cluster, the type of operating system cluster, the type of network, etc. In some examples, the request may include a request to place the one or more volumes into one or more volume groups. In some examples, the request may include an indication that each volume in a group be placed on a separate node. Additional constraints and requirements may be included in the request.

At block 904, the CVS retrieves current resource labels. In some examples, the CVS may retrieve the resource labels from cloud volume infrastructure (CVI) tables, such as CVI tables 212 of FIGS. 2A-2B. In some examples, the CVS may retrieve the resource labels from a software delivery engine (SDE) that is responsible for tracking all resources and the labels associated with the resources. In some examples, the labels are key-value pairs that describe aspects of the resource, such as for examples, name, location, type, etc. (e.g., allowing selection of hyperscaler cluster, a storage cluster, a networking switch, or a node" as with keywords). In some examples, the CVS may retrieve additional constraints for resources. In some examples, the additional constraints may be based on the requestor. For example, the additional constraints may identify one or more resources that belong to the requestor, and the CVS may use to direct placement of the requested volume.

At block 906, the CVS selects a VDS template to use for creating the VDS. The CVS may maintain one or more VDS templates for common volume placement request configurations. A VDS template may improve the speed and efficiency of creating a VDS for a given request. In some examples, the VDS template may need further modification for the volume placement request. In some examples, the CVS may create the VDS without the use of a template.

At block 908, the CVS translates the volume placement request to the VDS. The CVS may interface with multiple clients and/or proxies that use different APIs to request placement of a volume in the one or more heterogeneous storage systems. The CVS may understand the different requests received by the multiple clients and/or proxies and translate, or convert, the individual requests to the VDS. This translation decouples the client and/or proxy request from the back-end implementation of selecting a location to place a volume. As discussed above, decoupling the back-end from the request may improve efficiency and allow the back-end to be extensible.

Translating the request to the VDS may include determining the correct reserved keywords to be used in the VDS to properly convey the client request. Translating may further include identifying the appropriate values to assign to each reserved keyword based on the request. Additionally, the CVS may use the labels retrieved from the CVI tables to properly translate the client request.

At block 910, the CVS modifies the template selected at block 906 to include all of the requested constraints. In some examples, the VDS template may be expanded to account for all of the requested requirements and/or constraints. In some examples, portions of the VDS template may be removed when those portions are not needed for the current request. Modifications to the template may be made in response to the specific request received.

At block 912, the CVS transmits the VDS to a volume placement service (VPS). In some examples, the VPS may be running in the same cluster as the CVS. In some examples, the VPS may be running in a different cluster than the CVS. In some examples, there may be one VPS to handle volume placement requests for multiple CVS modules across multiple heterogeneous storage systems. In some examples, there may be more than one VPS working together to handle volume placement requests from multiple CVS.

At block 914, the CVS receives a location to place the volume. In some examples, there may be more than one location where each location is associated with each volume included in the volume placement request.

At block 916, the CVS places the one or more volumes in the locations provided by the VPS. In some examples, the CVS may create the volume at the location identified by the VPS.

At block 918, the CVS responds to the request to place one or more volumes.

Turning to FIG. 9B, in an embodiment, the method 930 may be implemented by an exemplary storage platform 102. In particular, the method 930 may be implemented by a cluster, such as a Kubernetes® cluster, of the storage platform 102 (which may be hosted by cloud system 106 or separately by storage platform 102). Specifically, the method 930 may be implemented by a volume placement service (VPS) running in a cluster. It is understood that additional steps can be provided before, during, and after the steps of method 930, and that some of the steps described can be replaced or eliminated for other embodiments of the method 930.

At block 932, the VPS receives a volume deployment specification (VDS) including a request to place one or more volumes. In some examples, the VPS receives the VDS from a cloud volume service (CVS). In some examples, the VPS and CVS are running in the same cluster. In some examples, the VPS and the CVS are running in different clusters. In some examples, the VPS may receive a VDS from multiple CVS running in one or more different clusters.

At block 934, the VPS parses, or translates, the VDS in order to process the request for volume placement. Parsing may be done using any known technique for parsing the format of the VDS (e.g., JSON, XML, YAML).

At block 936, the VPS identifies reserved keywords while parsing the VDS. The reserved keywords may define the request for volume placement such as the number of volumes, the number of volume groups, and which volumes belong to which groups, as an example. The reserved keywords may be the keywords that the VPS understands and uses to process the request for a location to place a volume.

At block 938, the VPS identifies labels while parsing the VDS. In some examples, the labels may be referred to as tags. The labels may be key-value pairs. In some examples, the VPS may not understand the labels. The VPS may use the labels for matching the request constraints to the labels on the resources.

At block 940, the VPS queries a database for resource use and limits. The database query results may include all available resource types. In some examples, the results may be returned in a hierarchical format having different levels, such as for example, hyperscaler cluster, operating system cluster, aggregate, node, etc. In some examples, the results may include one or more labels associated with each resource.

At block 942, the VPS determines the scope of the request based on the reserved keywords. The VPS may determine the number of volumes included in the request based on reserved keywords such as, for example, "volumes," "volumeAllocationUUID," "mandatory," etc. The VPS may determine the number of volume groups to requested based on other keywords, such as for example, "volumeGroups" and "groupid." In some examples, the VPS may determine the number of unique resources that are needed based on the reserved keywords in the VDS.

At block 944, the VPS filters the database query results based on the labels provided in the VDS. In some examples, the VPS may filter out all resources having a lower level than a filtered resource. For example, the VDS may specify a specific location and/or type of hyperscaler cluster to use. All resources associated with that specific hyperscaler cluster may be filtered based on the hyperscaler cluster being filtered.

At block 946, the VPS identifies a location for each of the one or more volumes included in the VDS. In some examples, the VPS may use a scoring function to identify the location(s). In some examples, the VPS may identify a location without using a scoring function. In some examples, the VPS may identify, e.g., return, a different resource, or location, for placing each volume from all of the volumes included in the VPS. These may to a variety of locations, or the same location. In some other examples, the VPS may identify a single resource, or location, for placing all of the volumes included in the VDS.

At block 948, the VPS responds to the CVS with a location for each volume in the VDS as identified at block 946.

Figure 10:
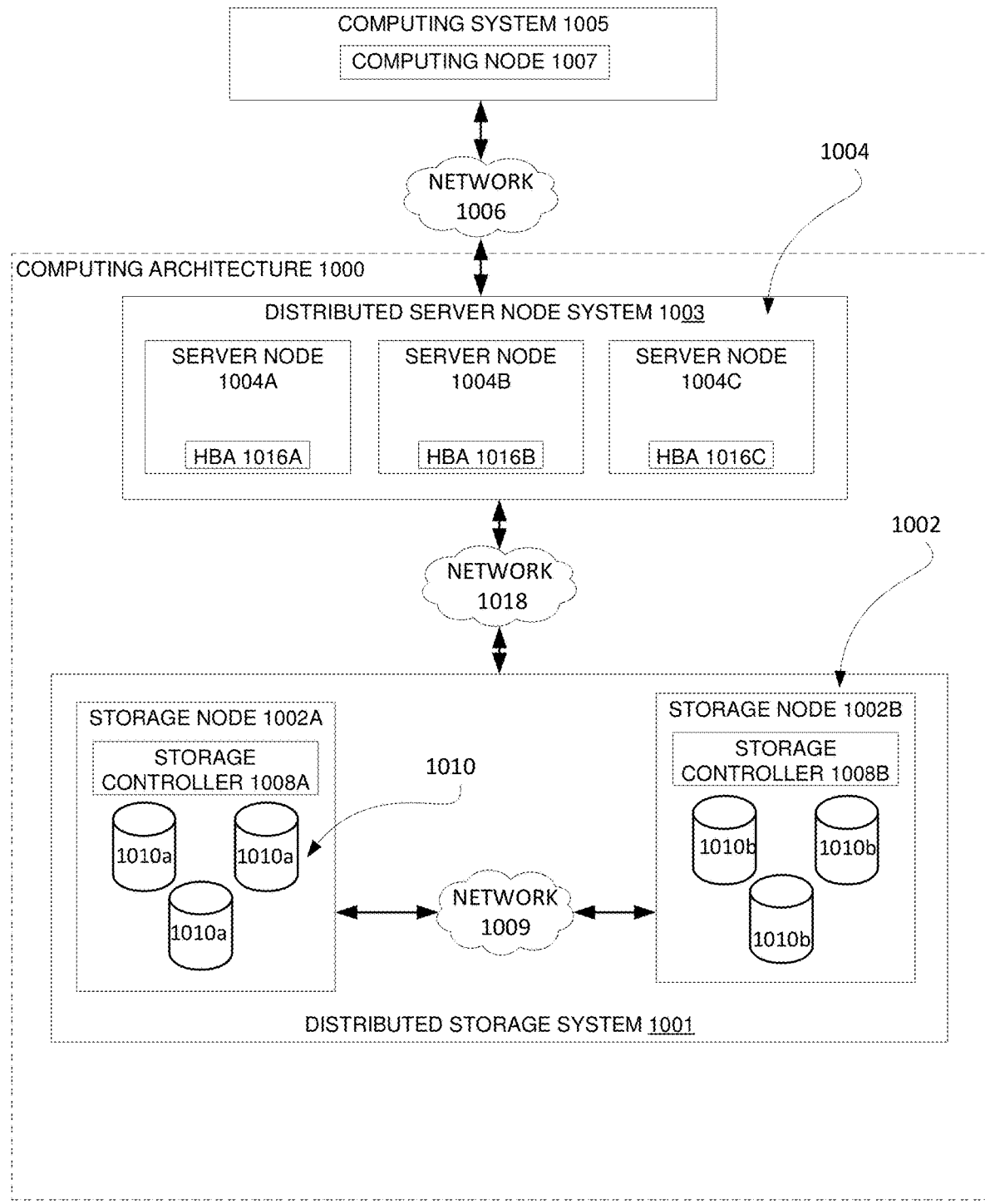
FIG. 10 is an illustration of an exemplary computing architecture according to some embodiments of the present description.

FIG. 10 is an illustration of a computing architecture 1000 in accordance with one or more example embodiments. The computing architecture 1000 is an example of one manner in which one or more of the computing architectures described herein may be implemented. The computing architecture 1000, which, in some cases includes a distributed storage system 1001 comprising a number of storage nodes 1002 (e.g., storage node 1002a, storage node 1002b) in communication with a distributed server node system 1003 comprising a number of server nodes 1004 (e.g., server node 1004a, server node 1004b, server node 1004c). The distributed storage system 1001 and the distributed server node system 1003 are examples in which containers, controllers, and/or clusters of the above figures may be implemented, for example.

A computing system 1005 communicates with the computing architecture 1000, and in particular, the distributed server node system 1003, via a network 1006. The network 1006 may include any number of wired communications links, wireless communications links, optical communications links, or combination thereof. In one or more examples, the network 1006 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 1005 may include, for example, at least one computing node 1007. The computing node 1007 may be implemented using hardware, software, firmware, or a combination thereof. In one or more other examples, the computing node 1007 is a client (or client service, customer, etc.) and the computing system 1005 that the client runs on is, for example, a physical server, a workstation, etc.

The storage nodes 1002 may be coupled via a network 1009, which may include any number of wired communications links, wireless communications links, optical communications links, or a combination thereof. For example, the network 1009 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 1009 may use a transmission control protocol/Internet protocol (TCP/IP), a remote direct memory access (RDMA) protocol (e.g., Infiniband®), RDMA over Converged Ethernet (RoCE) protocol (e.g., RoCEv1, RoCEv2), iWARP), and/or another type of protocol. Network 1009 may be local or remote with respect to a rack or datacenter. Additionally, or in the alternative, the network 1009 may extend between sites in a WAN configuration or be a virtual network extending throughout a cloud. Thus, the storage nodes 1002 may be as physically close or widely dispersed as needed depending on the application of use. In some examples, the storage nodes 1002 are housed in the same racks. In other examples, the storage nodes 1002 are located in different facilities at different sites around the world. The distribution and arrangement of the storage nodes 1002 may be determined based on cost, fault tolerance, network infrastructure, geography of the server nodes 1004, another consideration, or a combination thereof.

The distributed storage system 1001 processes data transactions on behalf of other computing systems such as, for example, the one or more server nodes 1004. The distributed storage system 1001 may receive data transactions from one or more of the server nodes 1004 and take an action such as reading, writing, or otherwise accessing the requested data. These data transactions may include server node read requests to read data from the distributed storage system 1001 and/or server node write requests to write data to the distributed storage system 1001. For example, in response to a request from one of the server nodes 1004a, 1004b, or 1004c, one or more of the storage nodes 1002 of the distributed storage system 1001 may return requested data, a status indictor, some other type of requested information, or a combination thereof, to the requesting server node. While two storage nodes 1002a and 1002b and three server nodes 1004a, 1004b, and 1004c are shown in FIG. 10, it is understood that any number of server nodes 1004 may be in communication with any number of storage nodes 1002. A request received from a server node, such as one of the server nodes 1004a, 1004b, or 1004c may originate from, for example, the computing node 1007 (e.g., a client service implemented within the computing node 1007) or may be generated in response to a request received from the computing node 1007 (e.g., a client service implemented within the computing node 1007).

While each of the server nodes 1004 and each of the storage nodes 1002 is referred to as a singular entity, a server node (e.g., server node 1004a, server node 1004b, or server node 1004c) or a storage node (e.g., storage node 1002a, or storage node 1002b) may be implemented on any number of computing devices ranging from a single computing system to a cluster of computing systems in communication with each other. In one or more examples, one or more of the server nodes 1004 may be run on a single computing system, which includes at least one processor such as a microcontroller or a central processing unit (CPU) operable to perform various computing instructions that are stored in at least one memory. In one or more examples, at least one of the server nodes 1004 and at least one of the storage nodes 1002 reads and executes computer readable code to perform the methods described further herein to orchestrate parallel file systems. The instructions may, when executed by one or more processors, cause the one or more processors to perform various operations described herein in connection with examples of the present disclosure. Instructions may also be referred to as code, as noted above.

A processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); at least one network interface such as an Ethernet interface, a wireless interface (e.g., IEEE 802.11 or other suitable standard), a SAN interface, a Fibre Channel interface, an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 1002 contains any number of storage devices 1010 for storing data and can respond to data transactions by the one or more server nodes 1004 so that the storage devices 1010 appear to be directly connected (i.e., local) to the server nodes 1004. For example, the storage node 1002a may include one or more storage devices 1010a and the storage node 1002b may include one or more storage devices 1010b. In various examples, the storage devices 1010 include HDDs, SSDs, and/or any other suitable volatile or non-volatile data storage medium. In some examples, the storage devices 1010 may be relatively homogeneous (e.g., having the same manufacturer, model, configuration, or a combination thereof). However, in other examples, one or both of the storage node 1002a and the storage node 1002b may alternatively include a heterogeneous set of storage devices 1010a or a heterogeneous set of storage device 1010b, respectively, that includes storage devices of different media types from different manufacturers with notably different performance.

The storage devices 1010 in each of the storage nodes 1002 are in communication with one or more storage controllers 1008. In one or more examples, the storage devices 1010a of the storage node 1002a are in communication with the storage controller 1008a, while the storage devices 1010b of the storage node 1002b are in communication with the storage controller 1008b. While a single storage controller (e.g., 1008a, 1008b) is shown inside each of the storage node 1002a and 1002b, respectively, it is understood that one or more storage controllers may be present within each of the storage nodes 1002a and 1002b.

The storage controllers 1008 exercise low-level control over the storage devices 1010 in order to perform data transactions on behalf of the server nodes 1004, and in so doing, may group the storage devices 1010 for speed and/or redundancy using a protocol such as RAID (Redundant Array of Independent/Inexpensive Disks). The grouping protocol may also provide virtualization of the grouped storage devices 1010. At a high level, virtualization includes mapping physical addresses of the storage devices 1010 into a virtual address space and presenting the virtual address space to the server nodes 1004, other storage nodes 1002, and other requestors. Accordingly, each of the storage nodes 1002 may represent a group of storage devices as a volume. A requestor can therefore access data within a volume without concern for how it is distributed among the underlying storage devices 1010.

The distributed storage system 1001 may group the storage devices 1010 for speed and/or redundancy using a virtualization technique such as RAID or disk pooling (that may utilize a RAID level). The storage controllers 1008a and 1008b are illustrative only; more or fewer may be used in various examples. In some cases, the distributed storage system 1001 may also be communicatively coupled to a user display for displaying diagnostic information, application output, and/or other suitable data.

With respect to the distributed server node system 1003, each of the one or more server nodes 1004 includes any computing resource that is operable to communicate with the distributed storage system 1001, such as by providing server node read requests and server node write requests to the distributed storage system 1001. In one or more examples, each of the server nodes 1004 is a physical server. In one or more examples, each of the server nodes 1004 includes one or more host bus adapters (HBA) 1016 in communication with the distributed storage system 1001. The HBA 1016 may provide, for example, an interface for communicating with the storage controllers 1008 of the distributed storage system 1001, and in that regard, may conform to any suitable hardware and/or software protocol. In various examples, the HBAs 1016 include Serial Attached SCSI (SAS), iSCSI, InfiniBand®, Fibre Channel, and/or Fibre Channel over Ethernet (FCoE) bus adapters. Other suitable protocols include SATA, eSATA, PATA, USB, and FireWire.

The HBAs 1016 of the server nodes 1004 may be coupled to the distributed storage system 1001 by a network 1018 comprising any number of wired communications links, wireless communications links, optical communications links, or combination thereof. For example, the network 1018 may include a direct connection (e.g., a single wire or other point-to-point connection), a networked connection, or any combination thereof. Examples of suitable network architectures for the network 1018 include a LAN, an Ethernet subnet, a PCI or PCIe subnet, a switched PCIe subnet, a WAN, a MAN, the Internet, Fibre Channel, or the like. In many examples, a server node 1004 may have multiple communications links with a single distributed storage system 1001 for redundancy. The multiple links may be provided by a single HBA 1016 or multiple HBAs 1016 within the server nodes 1004. In some examples, the multiple links operate in parallel to increase bandwidth.

In one or more examples, each of the server nodes 1004 may have another HBA that is used for communication with the computing system 1005 over the network 1007. In other examples, each of the server nodes 1004 may have some other type of adapter or interface for communication with the computing system 1005 over the network 1007.

To interact with (e.g., write, read, modify, etc.) remote data, a HBA 1016 sends one or more data transactions to the distributed storage system 1001. Data transactions are requests to write, read, or otherwise access data stored within a volume in the distributed storage system 1001, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 1001 executes the data transactions on behalf of the server nodes 1004 by writing, reading, or otherwise accessing data on the relevant storage devices 1010. A distributed storage system 1001 may also execute data transactions based on applications running on the distributed server node system 1003. For some data transactions, the distributed storage system 1001 formulates a response that may include requested data, status indicators, error messages, and/or other suitable data and provides the response to the provider of the transaction.

In one or more examples, an orchestration system may be a container orchestration system that enables file system services to be run in containers and volumes to be mounted from the distributed storage system 1001 to the distributed server node system 1003, in particular according to embodiments of the present disclosure.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   storing, in a label database, labels defining constraints to be applied for deploying volumes;
   storing, in a usage database, storage system usage values related to constraints contained in the label database and other storage system usage values;
   receiving, at a cloud volume service, a request to deploy a volume within a plurality of storage systems, wherein the request includes one or more terms on deployment of the volume;
   translating, by the cloud volume service, information from the request to deploy a volume into a format of a volume deployment specification using reserved keywords for one or more requirements, and labels from the label database for one or more constraints;
   sending, from the cloud volume service to a volume placement service, the volume deployment specification as a request for a location to deploy the volume;
   determining, by the volume placement service and based on the volume deployment specification, a location to deploy the volume based on referencing the usage database for values of the storage systems in the plurality of storage systems relevant to the requirements and the constraints, the reference to the usage database for the constraints using the labels;
   providing, by the volume placement service to the cloud volume service, the determined location of the volume; and
   placing, by the cloud volume service, the volume at the location determined by the volume placement service.

2. The method of claim 1, further comprising:
   storing additional labels in the label database to define additional constraints to be applied for deploying volume; and
   storing storage system usage values related to the additional constraints contained in the label database in the usage database,
   wherein the volume placement service utilizes the additional labels and additional constraints in determining a location to deploy a volume without reconfiguring the volume placement service to understand the additional labels and additional constraints.

3. The method of claim 1, wherein the translating includes:
   selecting a volume deployment specification template to begin the translation; and
   modifying the selected volume deployment specification template to include the one or more constraints on the deployment of the volume.

4. The method of claim 1, wherein the request to deploy a volume includes terms to request to deploy a group of volumes and a constraint that the respective volumes from the group of volumes be deployed into different nodes of the plurality of storage systems,
   wherein the request to deploy a group of volumes is translated using a reserved keyword and using a label in the label database for the constraint.

5. The method of claim 1, wherein a label in the label database comprises a key-value pair, the key representing the constraint and the value representing a value for the constraint.

6. The method of claim 1, wherein the one or more constraints identify a networking switch for deployment of the volume, the networking switch having a specific capability.

7. The method of claim 1, wherein the request to deploy a volume includes terms specifying a storage capacity and a throughput that are translated to reserved keywords and terms specifying a constraint on the deployment of the volume that are translated using a label in the label database.

8. A computing device comprising:
at least one memory storing machine readable instructions for utilizing a volume placement request fora storage system; and
at least one processor coupled to the memory, the at least one processor configured to execute the machine readable instructions to cause the at least one processor to:
receive a volume deployment specification (VDS) including a request for placement of a volume in a plurality of storage systems and one or more constraints on the placement of the volume, the VDS using reserved keywords for one or more requirements, and labels from a label database for the one or more constraints;
request, from a usage database, storage environment usage data relevant to the requirements and the constraints, wherein the storage environment usage data is referenced using one or more labels used to define the one or more constraints;
determine, based on the VDS and based on the requested storage environment usage data relevant to the requirements and the constraints, a location to deploy the volume; and
provide the determined location for deployment of the volume.

9. The computing device of claim 8, wherein the VDS includes reserved keywords to request to deploy a group of volumes and a label indicating a constraint that the respective volumes from the group of volumes be deployed into different nodes of the plurality of storage systems.

10. The computing device of claim 8, wherein the machine readable instructions further include instructions for causing the at least one processor to: parse the VDS to identify the one or more reserved keywords and the one or more labels.

11. The computing device of claim 8, wherein the determining a location to deploy the volume includes
filtering the storage environment data based on one or more labels in the VDS; and
removing locations from consideration that fail to satisfy the constraints defined by the one or more labels.

12. The computing device of claim 8, wherein the VDS includes one or more additional labels for one or more additional constraints,
wherein the storage environment usage data further includes usage data for the one or more additional labels, and
wherein the determining a location to deploy the volume utilizes the one or more additional labels and one or more additional constraints in determining a location to deploy a volume without understanding the additional labels and additional constraints.

13. The computing device of claim 8, wherein the VDS includes reserved keywords specifying a storage capacity and a throughput and a label specifying a constraint on the deployment of the volume.

14. The computing device of claim 8, wherein each of the one or more labels includes a key-value pair, the key representing the constraint and the value representing a value for the constraint.

15. A non-transitory machine readable medium having stored thereon instructions for performing a method of determining a location for performing a method to deploy a volume into a plurality of storage systems, which when executed by at least one machine, causes the at least one machine to:
receive volume deployment specification (VDS) requesting to deploy one or more volumes into a plurality of storage systems, the, the VDS using one or more reserved keywords for one or more requirements, and one or more labels from a label database for one or more constraints;
parse the VDS to identify one or more volumes to be placed into the plurality of storage systems, one or more reserved keywords identifying the one or more volumes, and one or more labels specifying constraints on deployment of the one or more volumes;
retrieve storage environment usage data relevant to the one or more requirements and the one or more constraints, wherein the storage environment usage data is referenced using the one or more labels used to define the one or more constraints;
determine, based on the VDS and based on the retrieved storage environment usage data relevant to the one or more requirements and the one or more constraints, one or more locations to deploy the one or more volumes; and
respond with the determined one or more locations to deploy the one or more volumes.

16. The non-transitory machine readable medium of claim 15, wherein the VDS includes one or more additional labels for one or more additional constraints, and
wherein the storage environment usage data further includes usage data for the one or more additional labels, and
non-transitory machine readable medium further comprising instructions, when executed by the at least one machine, causes the at least one machine to:
determine one or more locations to deploy the one or more volume utilizes the one or more additional labels and one or more additional constraints in determining a location to deploy the one or more volumes without understanding the additional labels and additional constraints.

17. The non-transitory machine readable medium of claim 15, wherein the VDS further includes a label specifying a constraint that the one or more volumes each be placed on different nodes of the plurality of storage system than each of the other volumes.

18. The non-transitory machine readable medium of claim 15, wherein the one or more reserved keywords further identifies at least one of a hyperscaler cluster, a storage cluster, a networking switch, or a node.

19. The non-transitory machine readable medium of claim 15, wherein the one or more labels further identifies at least one of a cluster name, a cluster location, or a type of encryption.

20. The non-transitory machine readable medium of claim 15, wherein each of the one or more labels includes a key-value pair, the key representing the constraint and the value representing a value for the constraint.

* * * * *